US 009898267B2

(12) United States Patent
Kee et al.

(10) Patent No.: US 9,898,267 B2
(45) Date of Patent: *Feb. 20, 2018

(54) CORRELATION ANALYSIS OF PROGRAM STRUCTURES

(71) Applicant: NATIONAL INSTRUMENTS CORPORATION, Austin, TX (US)

(72) Inventors: Hojin Kee, Austin, TX (US); Haoran Yi, Austin, TX (US); Tai A. Ly, Austin, TX (US); Newton G. Petersen, Emporia, KS (US); James M. Lewis, Austin, TX (US); Dustyn K. Blasig, Pflugerville, TX (US); Adam T. Arnesen, Pflugerville, TX (US); Taylor L. Riche, Austin, TX (US)

(73) Assignee: NATIONAL INSTRUMENTS CORPORATION, Austin, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/277,660

(22) Filed: Sep. 27, 2016

(65) Prior Publication Data

US 2017/0083299 A1    Mar. 23, 2017

Related U.S. Application Data

(63) Continuation of application No. 14/510,441, filed on Oct. 9, 2014, now Pat. No. 9,489,181.

(51) Int. Cl.
*G06F 9/44* (2006.01)
*G06F 9/45* (2006.01)

(52) U.S. Cl.
CPC .............. *G06F 8/443* (2013.01); *G06F 8/20* (2013.01); *G06F 8/34* (2013.01)

(58) Field of Classification Search
CPC .................. G06F 8/443; G06F 8/20
(Continued)

(56) References Cited

U.S. PATENT DOCUMENTS 4,388,701 A * 6/1983 Aichelmann, Jr. .. G11C 19/285
365/221
4,914,568 A * 4/1990 Kodosky .......... G01R 31/31912
703/2

(Continued)

OTHER PUBLICATIONS

National Instruments—"NI LabView Compiler: Under the Hood" (Jul. 29, 2010) retrieved Dec. 16, 2015 from <http://www.ni.com/tutorial/11472/en/> (9 pages).

*Primary Examiner* — Lewis A Bullock, Jr.
*Assistant Examiner* — Theodore Hebert
(74) *Attorney, Agent, or Firm* — Meyertons Hood Kivlin Kowert & Goetzel, P.C.; Jeffrey C. Hood; Mark S. Williams

(57) ABSTRACT

System and method for performing correlation analysis. A program that includes multiple program structures and one or more data objects is stored. Each data object is shared by at least two of the program structures. For each program structure, decomposition effects on each of the data objects shared by the program structure resulting from each of a respective one or more optimizing transforms applied to the program structure are analyzed. One or more groups of correlated structures are determined based on the analyzing. Each group includes two or more program structures that share at least one data object, and at least one optimizing transform that is compatible with respect to the two or more program structures and the shared data object. For at least one group, the at least one optimizing transform is usable to transform the two or more program structures to meet a specified optimization objective.

20 Claims, 13 Drawing Sheets

(58) Field of Classification Search
USPC .......................................................... 717/105
See application file for complete search history.

(56) References Cited

U.S. PATENT DOCUMENTS

| | | | | |
|---|---|---|---|---|
| 5,367,651 A * | 11/1994 | Smith | G06F 8/441 | 717/149 |
| 5,442,790 A * | 8/1995 | Nosenchuck | G06F 8/443 | 717/146 |
| 5,481,741 A * | 1/1996 | McKaskle | G06F 3/0481 | 345/522 |
| 5,889,999 A * | 3/1999 | Breternitz, Jr. | G06F 8/445 | 712/201 |
| 6,055,627 A | 4/2000 | Kyushima | G06F 8/443 | 712/233 |
| 6,381,739 B1 * | 4/2002 | Breternitz, Jr. | G06F 8/443 | 714/37 |
| 7,725,874 B2 * | 5/2010 | Kornerup | G06F 8/34 | 717/105 |
| 8,028,241 B2 * | 9/2011 | Kodosky | G06F 3/0484 | 715/762 |
| 8,316,311 B2 * | 11/2012 | Nattinger | G06F 11/323 | 715/763 |
| 8,478,967 B2 * | 7/2013 | Bordelon | G06F 8/433 | 712/11 |
| 8,510,709 B2 * | 8/2013 | Bordelon | G06F 8/452 | 717/105 |
| 8,572,595 B1 * | 10/2013 | Lethin | G06F 8/443 | 717/127 |
| 8,656,345 B2 * | 2/2014 | Liang | G05B 19/0426 | 715/735 |
| 8,972,943 B2 * | 3/2015 | Papakipos | G06F 9/5027 | 714/35 |
| 2002/0100031 A1 * | 7/2002 | Miranda | G06F 8/443 | 717/152 |
| 2003/0005419 A1 * | 1/2003 | Pieper | G06F 8/4442 | 717/141 |
| 2003/0088860 A1 * | 5/2003 | Wang | G06F 8/443 | 717/153 |
| 2003/0097538 A1 * | 5/2003 | Hall | G06F 8/4442 | 711/201 |
| 2004/0034847 A1 * | 2/2004 | Joffrain | G06F 8/34 | 717/113 |
| 2005/0091602 A1 * | 4/2005 | Ramamoorthy | G05B 19/0426 | 715/763 |
| 2005/0268288 A1 * | 12/2005 | Nattinger | G06F 8/34 | 717/125 |
| 2006/0248520 A1 * | 11/2006 | Kawabata | G06F 8/443 | 717/160 |
| 2008/0034298 A1 * | 2/2008 | Kodosky | G06F 3/0484 | 715/763 |
| 2008/0034360 A1 * | 2/2008 | Bodin | G06F 8/443 | 717/154 |
| 2008/0250401 A1 * | 10/2008 | Puri | G06F 8/433 | 717/160 |
| 2009/0064119 A1 * | 3/2009 | Archambault | G06F 8/4441 | 717/160 |
| 2010/0095285 A1 * | 4/2010 | Gschwind | G06F 8/4441 | 717/154 |
| 2010/0218196 A1 * | 8/2010 | Leung | G06F 8/453 | 718/107 |
| 2010/0306736 A1 * | 12/2010 | Bordelon | G06F 8/452 | 717/109 |
| 2012/0167069 A1 * | 6/2012 | Lin | G06F 8/456 | 717/160 |
| 2012/0254845 A1 * | 10/2012 | Yi | G06F 8/45 | 717/144 |
| 2014/0019949 A1 * | 1/2014 | Craymer | G06F 8/443 | 717/150 |
| 2014/0165047 A1 * | 6/2014 | Lethin | G06F 8/443 | 717/151 |
| 2016/0103664 A1 * | 4/2016 | Kee | G06F 8/34 | 717/105 |

* cited by examiner

CORRELATION ANALYSIS OF PROGRAM STRUCTURES

PRIORITY CLAIM

This application is a continuation of U.S. patent application Ser. No. 14/510,441 titled "Correlation Analysis of Program Structures" filed Oct. 9, 2014, which is hereby incorporated by reference in its entirety as though fully and completely set forth herein.

FIELD OF THE INVENTION

The present invention relates to the field of program optimization, and more particularly to a system and method for correlation analysis of program structures.

DESCRIPTION OF THE RELATED ART

In the compilation of programs, any number of transformations (also referred to herein as transforms) may be applied to program structures. For example, a FOR loop may be unrolled into multiple FOR loops, code motion transformations may be applied to a structure, and so forth.

The number of possible combinations of transformations increases exponentially as the number of such program structures increases. Trying all or most combinations to see which transformation combination produces the best result, becomes cost prohibitive with large combinations of transformations.

Separately, any number of decompositions may be applied to program data structures. For example, an array may be decomposed into a number of smaller arrays; a cluster may be decomposed into its individual fields; an array of clusters (a heterogeneous data structure) may be decomposed into multiple arrays, one for each individual field in the cluster, and so forth. Each such decomposition may help improve some objective metric such as run time, code size, compilation time, e.g., to meet a specified optimization objective.

Note, however, that each transformation of a program structure may affect how each data structure in the program structure may be (properly) decomposed. For example, by fully unrolling a FOR loop, decomposition of an array to its individual elements (the scalarization decomposition) may be enabled. Conversely, by not fully unrolling this FOR loop, scalarization of this array may be prevented.

Graphical programming has become a powerful tool available to programmers. Graphical programming environments such as the National Instruments LabVIEW product have become very popular. Tools such as LabVIEW have greatly increased the productivity of programmers, and increasing numbers of programmers are using graphical programming environments to develop their software applications. In particular, graphical programming tools are being used for test and measurement, data acquisition, process control, man machine interface (MMI), supervisory control and data acquisition (SCADA) applications, modeling, simulation, image processing/machine vision applications, and motion control, among others.

SUMMARY OF THE INVENTION

Various embodiments of a system and method for correlation analysis of program structures are presented below.

A program that includes a plurality of program structures and one or more data objects may be stored, e.g., in a memory medium. Each of the one or more data objects may be shared by a respective at least two of the plurality of program structures. In other words, in the program, each data object is operated on or processed by at least two of the program structures. The program may be of any type desired. For example, the program may include one or more of: a data flow program, a graphical program, a graphical data flow program, or a hardware description program, among others. Further examples of contemplated program types include, but are not limited to, one or more of: a procedural program, a functional program, a textual program, or a declarative program.

For each program structure of the plurality of program structures, decomposition effects on each of the one or more data objects shared by the program structure resulting from each of a respective one or more optimizing transforms applied to the program structure may be analyzed. Said another way, for each of the program structures, the effects on (one or more) shared data objects of applying optimizing transforms to the program structure (that shares the data objects) may be determined, where the particular effects analyzed are decomposition effects, e.g., the results of splitting, partitioning, or otherwise modifying data objects as a consequence of applying the optimizing transform(s) to the program structure. Examples of decomposition effects include, but are not limited to, arrays resulting from array partitioning, arrays resulting from array jamming, arrays resulting from array copying, arrays resulting from array remapping, arrays resulting from array linearization (e.g. from a 2 dimensional (2D) array down to 1D array), scalar data objects resulting from scalarization of array, cluster, record, or struct, number of bits required to store and represent data objects, array sizes required to store and represent arrays, estimated performance metric(s) (e.g., throughput, latency, power), estimated resource usage metric(s) (e.g. FPGA resource utilization, ASIC gate count), maximum path length in dataflow graphs, cycle path length in feedback loops in dataflow graphs, or numbers of nodes or edges in dataflow graphs, among others.

In one embodiment, the analyzing (decomposition effects) may be performed in context of the program structure and independent of other program structures in the program. In other words, the decomposition effects may be analyzed with respect to the (currently considered) program structure without regard to the other program structures in the program.

In one embodiment, analyzing decomposition effects of each of the respective one or more optimizing transforms may include, for at least one transform of the respective one or more optimizing transforms: applying a corresponding transform to a model of the program structure and the at least one data object, wherein the applying generates estimated decomposition effects of the at least one transform, and analyzing the estimated decomposition effects. In other words, rather than applying the transform to the program structure to determine the decomposition effects, a simpler (and thus, faster) process is used, where a different transform (that corresponds to the transform) is applied to a model of the program structure and the data object to generate an estimate (or projection or prediction) of the decomposition effects of the at least one transform (on the data object). In one embodiment, a module, e.g., design planning module, may be included in a compiler, where the module calculates these estimated or projected effects based on simplified program structures and/or data objects (i.e., the model), i.e., the module may execute (during or in association with compilation) the model to produce the estimate(s) of decomposition effects. Moreover, in one embodiment, the method may include analyzing the program structure and the at least one data object, and generating (or extracting) the model of the program structure and/or the at least one data object based on the analysis.

One or more groups of correlated structures may be determined based on the above analyzing. Each group of correlated structures may include two or more program structures that share at least one data object, and at least one optimizing transform that is compatible with respect to the two or more program structures and the shared at least one data object. In other words, a group of correlated structures has a(t least one) respective optimizing transform that is compatible with respect to program structures in the group regarding the shared data object. For at least one group of correlated structures, the at least one optimizing transform may be usable to transform the two or more program structures to meet a specified optimization objective.

In various embodiments, the respective one or more optimizing transforms may include at least one of: loop unrolling, loop merging, loop splitting, loop peeling, rewriting a WHILE loop as a FOR loop with conditional exit, code motion, code outlining, code clumping, or in-lining a subprogram, function, or procedure, among others.

The specified optimization objective may be of any type desired, depending on the application. For example, the specified optimization objective may be with respect to, but is not limited to, optimization of one or more of: run time, compile time, code size, memory footprint size, stack size, processor concurrency (e.g., on multicore processors of desktop or real time (RT) platforms), programmable hardware element (PHE) or application specific integrated circuit (ASIC) resource utilization, PHE or ASIC compile time, PHE bitfile size, ASIC netlist file size, PHE or ASIC clock rate, PHE or ASIC throughput, PHE or ASIC latency, or PHE or ASIC I/O sampling rate, among others. In other words, the optimization objective may be to extremize (i.e., minimize or maximize) one or more parameters, attributes, or metrics, regarding the program and/or its implementation, as desired. In some embodiments, at least one of the respective one or more optimizing transforms is or includes a combination of optimizing transforms. Thus, one or more of the optimizing transforms may be a compound transform.

Note that in some embodiments, further analysis may be performed to optimize the program. For example, in one embodiment, the one or more groups of correlated structures may include a plurality of groups of correlated structures, where two or more of the groups of correlated structures share a program structure. The two or more of the groups of correlated structures may be analyzed, and based on this further analyzing, a determination may be made as to whether the respective at least one optimizing transform of at least one of the two or more groups of correlated structures is compatible with respect to the other groups of the two or more groups of correlated structures. Said another way, the plurality of groups of correlated structures may be analyzed to determine whether the at least one optimizing transform (of at least one of the two or more groups of correlated structures) is applicable to the program structure(s) of other groups of correlated structures without causing conflicting decomposition effects on the associated data objects of those groups.

In one embodiment, the at least one optimizing transform may be determined to be compatible with the two or more program structures and the shared at least one data object when the respective decomposition effects of the at least one optimizing transform on the shared at least one data object with respect to the two or more program structures have at least one of the following relationships: equality, less than, or less than or equal to, greater than, or greater than or equal to, implied by, subsumed by, non-overlapping, or non-intersecting.

In one exemplary set of embodiments, the method may determine, based on this analysis of the two or more of the groups of correlated structures, that a first respective at least one optimizing transform of one of the two or more groups of correlated structures is compatible with respect to all other groups of the two or more groups of correlated structures. The first respective at least one optimizing transform may be usable to transform the respective two or more program structures and the at least one data object of each of the two or more groups of correlated structures to meet the specified optimization objective.

In another embodiment, the method may determine, based on this analyzing (of the two or more of the groups of correlated structures), that a respective at least one optimizing transform of at least two of the two or more groups of correlated structures is compatible with all other groups of the two or more groups of correlated structures, and may analyze each of the respective at least one optimizing transforms of the at least two of the two or more groups of correlated structures. The method may then select a first respective at least one optimizing transform based on the analyzing each of the respective at least one optimizing transforms. The first respective at least one optimizing transform may be usable to transform the respective two or more program structures and the at least one data object of each of the two or more groups of correlated structures to meet the specified optimization objective.

Accordingly, in some embodiments, the method may include, for the at least one group of correlated structures, applying the at least one optimizing transform to the two or more program structures and the at least one data object to meet the specified optimization objective. Note, however, that in at least one embodiment, the method may determine, based on the analyzing the two or more of the groups of correlated structures, that no respective optimizing transform of each of the two or more groups of correlated structures is compatible with all other groups of the two or more groups of correlated structures, and may indicate that the respective optimizing transforms of the two or more groups are incompatible for use in transforming the program structures and data objects of the two or more groups. For example, an indication may be output, e.g., to a log file, report, or to a display, or, as another exemplary example, indications may be displayed in the program itself.

The method may further include compiling the program, including generating code configured to run on one or more of: a desktop computer with one or more central processing unit (CPU) cores, an embedded computer with one or more CPU cores, a graphics processing unit (GPU), an embedded GPU, a field programmable gate array (FPGA), or an application specific integrated circuit (ASIC).

In one embodiment, some or all of the method elements discussed above may be performed as part of the compilation process, although in other embodiments, the method may be performed prior to compilation of the program.

BRIEF DESCRIPTION OF THE DRAWINGS

A better understanding of the present invention can be obtained when the following detailed description of the preferred embodiment is considered in conjunction with the following drawings, in which.

Figure 1A:
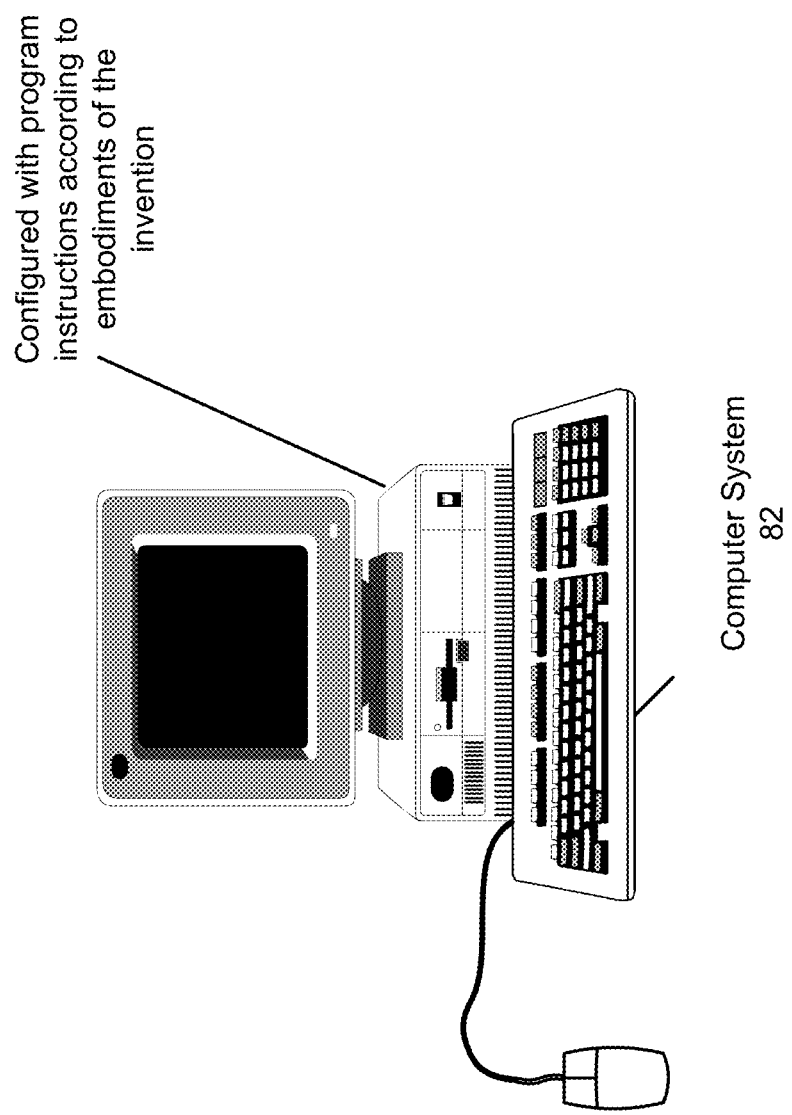
FIG. 1A illustrates a computer system configured to execute a graphical program according to an embodiment of the present invention.

While the invention is susceptible to various modifications and alternative forms, specific embodiments thereof are shown by way of example in the drawings and are herein described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE INVENTION

Incorporation by Reference

The following references are hereby incorporated by reference in their entirety as though fully and completely set forth herein:

U.S. Pat. No. 4,914,568 titled "Graphical System for Modeling a Process and Associated Method," issued on Apr. 3, 1990.

U.S. Pat. No. 5,481,741 titled "Method and Apparatus for Providing Attribute Nodes in a Graphical Data Flow Environment".

U.S. Pat. No. 6,173,438 titled "Embedded Graphical Programming System" filed Aug. 18, 1997.

U.S. Pat. No. 6,219,628 titled "System and Method for Configuring an Instrument to Perform Measurement Functions Utilizing Conversion of Graphical Programs into Hardware Implementations," filed Aug. 18, 1997.

U.S. Pat. No. 7,210,117 titled "System and Method for Programmatically Generating a Graphical Program in Response to Program Information," filed Dec. 20, 2000.

TERMS

The following is a glossary of terms used in the present application:

Memory Medium—Any of various types of non-transitory computer accessible memory devices or storage devices. The term "memory medium" is intended to include an installation medium, e.g., a CD-ROM, floppy disks 104, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may comprise other types of non-transitory memory as well or combinations thereof. In addition, the memory medium may be located in a first computer in which the programs are executed, or may be located in a second different computer which connects to the first computer over a network, such as the Internet. In the latter instance, the second computer may provide program instructions to the first computer for execution. The term "memory medium" may include two or more memory mediums which may reside in different locations, e.g., in different computers that are connected over a network.

Carrier Medium—a memory medium as described above, as well as a physical transmission medium, such as a bus, network, and/or other physical transmission medium that conveys signals such as electrical, electromagnetic, or digital signals.

Programmable Hardware Element—includes various hardware devices comprising multiple programmable function blocks connected via a programmable interconnect. Examples include FPGAs (Field Programmable Gate Arrays), PLDs (Programmable Logic Devices), FPOAs (Field Programmable Object Arrays), and CPLDs (Complex PLDs). The programmable function blocks may range from fine grained (combinatorial logic or look up tables) to coarse grained (arithmetic logic units or processor cores). A programmable hardware element may also be referred to as "reconfigurable logic".

Software Program—the term "software program" is intended to have the full breadth of its ordinary meaning, and includes any type of program instructions, code, script and/or data, or combinations thereof, that may be stored in a memory medium and executed by a processor. Exemplary software programs include programs written in text-based programming languages, such as C, C++, PASCAL, FORTRAN, COBOL, JAVA, assembly language, etc.; graphical programs (programs written in graphical programming languages); assembly language programs; programs that have been compiled to machine language; scripts; and other types of executable software. A software program may comprise two or more software programs that interoperate in some manner. Note that various embodiments described herein may be implemented by a computer or software program. A software program may be stored as program instructions on a memory medium.

Hardware Configuration Program—a program, e.g., a netlist or bit file, that can be used to program or configure a programmable hardware element.

Program—the term "program" is intended to have the full breadth of its ordinary meaning. The term "program" includes 1) a software program which may be stored in a memory and is executable by a processor or 2) a hardware configuration program useable for configuring a programmable hardware element.

Graphical Program—A program comprising a plurality of interconnected nodes or icons, wherein the plurality of interconnected nodes or icons visually indicate functionality of the program. The interconnected nodes or icons are graphical source code for the program. Graphical function nodes may also be referred to as blocks.

The following provides examples of various aspects of graphical programs. The following examples and discussion are not intended to limit the above definition of graphical program, but rather provide examples of what the term "graphical program" encompasses:

The nodes in a graphical program may be connected in one or more of a data flow, control flow, and/or execution flow format. The nodes may also be connected in a "signal flow" format, which is a subset of data flow.

Exemplary graphical program development environments which may be used to create graphical programs include Lab VIEW®, DasyLab™, DIADem™ and Matrixx/SystemBuild™ from National Instruments, Simulink® from the MathWorks, VEE™ from Agilent, WiT™ from Coreco, Vision Program Manager™ from PPT Vision, SoftWIRE™ from Measurement Computing, Sanscript™ from Northwoods Software, Khoros™ from Khoral Research, SnapMaster™ from HEM Data, VisSim™ from Visual Solutions, ObjectBench™ by SES (Scientific and Engineering Software), and VisiDAQ™ from Advantech, among others.

The term "graphical program" includes models or block diagrams created in graphical modeling environments, wherein the model or block diagram comprises interconnected blocks (i.e., nodes) or icons that visually indicate operation of the model or block diagram; exemplary graphical modeling environments include Simulink®, SystemBuild™, VisSim™, Hypersignal Block Diagram™, etc.

A graphical program may be represented in the memory of the computer system as data structures and/or program instructions. The graphical program, e.g., these data structures and/or program instructions, may be compiled or interpreted to produce machine language that accomplishes the desired method or process as shown in the graphical program.

Input data to a graphical program may be received from any of various sources, such as from a device, unit under test, a process being measured or controlled, another computer program, a database, or from a file. Also, a user may input data to a graphical program or virtual instrument using a graphical user interface, e.g., a front panel.

A graphical program may optionally have a GUI associated with the graphical program. In this case, the plurality of interconnected blocks or nodes are often referred to as the block diagram portion of the graphical program.

Node—In the context of a graphical program, an element that may be included in a graphical program. The graphical program nodes (or simply nodes) in a graphical program may also be referred to as blocks. A node may have an associated icon that represents the node in the graphical program, as well as underlying code and/or data that implements functionality of the node. Exemplary nodes (or blocks) include function nodes, sub-program nodes, terminal nodes, structure nodes, etc. Nodes may be connected together in a graphical program by connection icons or wires.

Data Flow Program—A Software Program in which the program architecture is that of a directed graph specifying the flow of data through the program, and thus functions execute whenever the necessary input data are available. Said another way, data flow programs execute according to a data flow model of computation under which program functions are scheduled for execution in response to their necessary input data becoming available. Data flow programs can be contrasted with procedural programs, which specify an execution flow of computations to be performed. As used herein "data flow" or "data flow programs" refer to "dynamically-scheduled data flow" and/or "statically-defined data flow".

Graphical Data Flow Program (or Graphical Data Flow Diagram)—A Graphical Program which is also a Data Flow Program. A Graphical Data Flow Program comprises a plurality of interconnected nodes (blocks), wherein at least a subset of the connections among the nodes visually indicate that data produced by one node is used by another node. A Lab VIEW VI is one example of a graphical data flow program. A Simulink block diagram is another example of a graphical data flow program.

Graphical User Interface—this term is intended to have the full breadth of its ordinary meaning. The term "Graphical User Interface" is often abbreviated to "GUI". A GUI may comprise only one or more input GUI elements, only one or more output GUI elements, or both input and output GUI elements.

The following provides examples of various aspects of GUIs. The following examples and discussion are not intended to limit the ordinary meaning of GUI, but rather provide examples of what the term "graphical user interface" encompasses:

A GUI may comprise a single window having one or more GUI Elements, or may comprise a plurality of individual GUI Elements (or individual windows each having one or more GUI Elements), wherein the individual GUI Elements or windows may optionally be tiled together.

A GUI may be associated with a graphical program. In this instance, various mechanisms may be used to connect GUI Elements in the GUI with nodes in the graphical program. For example, when Input Controls and Output Indicators are created in the GUI, corresponding nodes (e.g., terminals) may be automatically created in the graphical program or block diagram. Alternatively, the user can place terminal nodes in the block diagram which may cause the display of corresponding GUI Elements front panel objects in the GUI, either at edit time or later at run time. As another example, the GUI may comprise GUI Elements embedded in the block diagram portion of the graphical program.

Front Panel—A Graphical User Interface that includes input controls and output indicators, and which enables a user to interactively control or manipulate the input being provided to a program, and view output of the program, while the program is executing.

A front panel is a type of GUI. A front panel may be associated with a graphical program as described above.

In an instrumentation application, the front panel can be analogized to the front panel of an instrument. In an industrial automation application the front panel can be analogized to the MMI (Man Machine Interface) of a device. The user may adjust the controls on the front panel to affect the input and view the output on the respective indicators.

Graphical User Interface Element—an element of a graphical user interface, such as for providing input or displaying output. Exemplary graphical user interface elements comprise input controls and output indicators.

Input Control—a graphical user interface element for providing user input to a program. An input control displays the value input by the user and is capable of being manipulated at the discretion of the user. Exemplary input controls comprise dials, knobs, sliders, input text boxes, etc.

Output Indicator—a graphical user interface element for displaying output from a program. Exemplary output indicators include charts, graphs, gauges, output text boxes, numeric displays, etc. An output indicator is sometimes referred to as an "output control".

Computer System—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

Measurement Device—includes instruments, data acquisition devices, smart sensors, and any of various types of devices that are configured to acquire and/or store data. A measurement device may also optionally be further configured to analyze or process the acquired or stored data. Examples of a measurement device include an instrument, such as a traditional stand-alone "box" instrument, a computer-based instrument (instrument on a card) or external instrument, a data acquisition card, a device external to a computer that operates similarly to a data acquisition card, a smart sensor, one or more DAQ or measurement cards or modules in a chassis, an image acquisition device, such as an image acquisition (or machine vision) card (also called a video capture board) or smart camera, a motion control device, a robot having machine vision, and other similar types of devices. Exemplary "stand-alone" instruments include oscilloscopes, multimeters, signal analyzers, arbitrary waveform generators, spectroscopes, and similar measurement, test, or automation instruments.

A measurement device may be further configured to perform control functions, e.g., in response to analysis of the acquired or stored data. For example, the measurement device may send a control signal to an external system, such as a motion control system or to a sensor, in response to particular data. A measurement device may also be configured to perform automation functions, i.e., may receive and analyze data, and issue automation control signals in response.

Functional Unit (or Processing Element)—refers to various elements or combinations of elements. Processing elements include, for example, circuits such as an ASIC (Application Specific Integrated Circuit), portions or circuits of individual processor cores, entire processor cores, individual processors, programmable hardware devices such as a field programmable gate array (FPGA), and/or larger portions of systems that include multiple processors, as well as any combinations thereof.

Automatically—refers to an action or operation performed by a computer system (e.g., software executed by the computer system) or device (e.g., circuitry, programmable hardware elements, ASICs, etc.), without user input directly specifying or performing the action or operation. Thus the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

Concurrent—refers to parallel execution or performance, where tasks, processes, or programs are performed in an at least partially overlapping manner. For example, concurrency may be implemented using "strong" or strict parallelism, where tasks are performed (at least partially) in parallel on respective computational elements, or using "weak parallelism", where the tasks are performed in an interleaved manner, e.g., by time multiplexing of execution threads.

Convergence Property—an indication of the number of times a program must be executed in order to collect all possible values for a particular set of variables. One particular example of a convergence property is a convergence number, which is thus the number of times the program must be executed in order to collect all possible values for a particular set of variables, e.g., array indices. Other forms of a convergence property may include multiple such numbers, e.g., for array indices of different arrays, or derivative values, e.g., maximum convergence numbers, etc., and so forth, as desired.

Compatible—refers to transforms that can operate on two or more program structures that share a data object without causing conflicting decomposition effects on the shared data object. For example, when a loop-unrolling transform is applied to a FOR loop (program structure) containing an array (data object), one of the decomposition effects may be partitioning of this array into two or more sub-arrays. If loop-unrolling of one FOR loop would cause an array to be partitioned into two sub-arrays of equal sizes, and another loop-unrolling of a different FOR loop would partition the same array into three sub-arrays of equal sizes, these loop-unrolling transforms applied to these two FOR loops are incompatible because they result in conflicting decomposition effects on the array (data object), because an array cannot simultaneously be partitioned into two and three sub-arrays. In contrast, if the decomposition effects are instead partitioning of the array into two and four sub-arrays of equal sizes, respectively, then these loop-unrolling transforms are compatible because the resulting partitioned sub-arrays do not conflict; the array can be partitioned into two sub-arrays of equal sizes, which can each then be partitioned into another two further sub-arrays of equal sizes, therefore making four sub-arrays of equal sizes. This is an example where "equality" of decomposition effects is not required for compatible transforms, but rather is a more general case where the decomposition effects do not conflict (e.g., 2 sub-arrays of equal sizes do not conflict with 4 sub-arrays of equal sizes).

Jamming Factor (of arrays)—in the context of program loop transformations, e.g., "unroll-and-jam" loop transformations that include loop unrolling followed by loop fusion, refers to the loop unrolling factor.

Array Remapping—refers to rewriting a program's array accesses as accesses to a second array of different dimension and/or data types. Note that there are more general versions of array remapping, but that important array remappings include cases where an N word by M bit array is rewritten into an N/2 by M*2 bit array, or N/4 by M*4 bit array. Thus, for example, a 100 word array of integers may be remapped into a 50 word array of longs (long integers twice the size (bits) of integers), changing all array accesses accordingly). Of course, other factors besides 2 and 4 may be used as desired, depending on the application.

Program Structures—refers to program elements that execute to process data in some manner. Examples of program structures include, but are not limited to, loops, e.g., FOR loops, WHILE loops, and UNTIL loops, as well as case functions (case/switch statements), procedures, and subroutines, e.g., LabVIEW subVIs, which are graphical subprograms.

Related Program Structures—refers to program structures that share one or more data objects that may be decomposed by one or more optimizing transforms.

Correlated Program Structures—refers to related program structures that have at least one optimizing transform that is compatible with at least one of the data objects shared by the related program structures.

Data Object—refers to any type of variable or data structure, including, but not limited to, any of: a static or global variable, an array, a cluster, struct, or record, and combinations and nestings thereof, e.g., an array of arrays, clusters, structs, or records, a cluster of arrays, a struct of arrays, a record of arrays, and so forth. Note that as used herein "data object" is not limited to object oriented (data) objects.

FIG. 1A—Computer System

FIG. 1A illustrates a computer system 82 configured to implement embodiments of the present techniques.

As shown in FIG. 1A, the computer system 82 may include a display device configured to display a program, such as a graphical program, as the program is created, executed, or analyzed.

The display device may also be configured to display a graphical user interface, e.g., in embodiments where the program is a graphical program, a front panel, of the program during execution of the program. The graphical user interface may comprise any type of graphical user interface, e.g., depending on the computing platform.

The computer system 82 may include at least one memory medium on which one or more computer programs or software components according to embodiments of the present invention may be stored. For example, in some embodiments, the computer system may store one or more software tools configured to perform the correlation analysis techniques disclosed herein. For example, in some embodiments, the memory medium may store one or more graphical programs which are executable to perform the methods described herein. Additionally, the memory medium may store a graphical programming development environment application used to create and/or execute such graphical programs. It should be noted, however, that while the techniques disclosed herein are primarily described in terms of graphical programs, the techniques are broadly applicable to other types of programs, as well, e.g., text based programs. In some embodiments, the software tool(s) may be incorporated in or integrated into the development environment. The memory medium may also store operating system software, as well as other software for operation of the computer system. Various embodiments further include receiving or storing instructions and/or data implemented in accordance with the foregoing description upon a carrier medium.

Figure 1B:
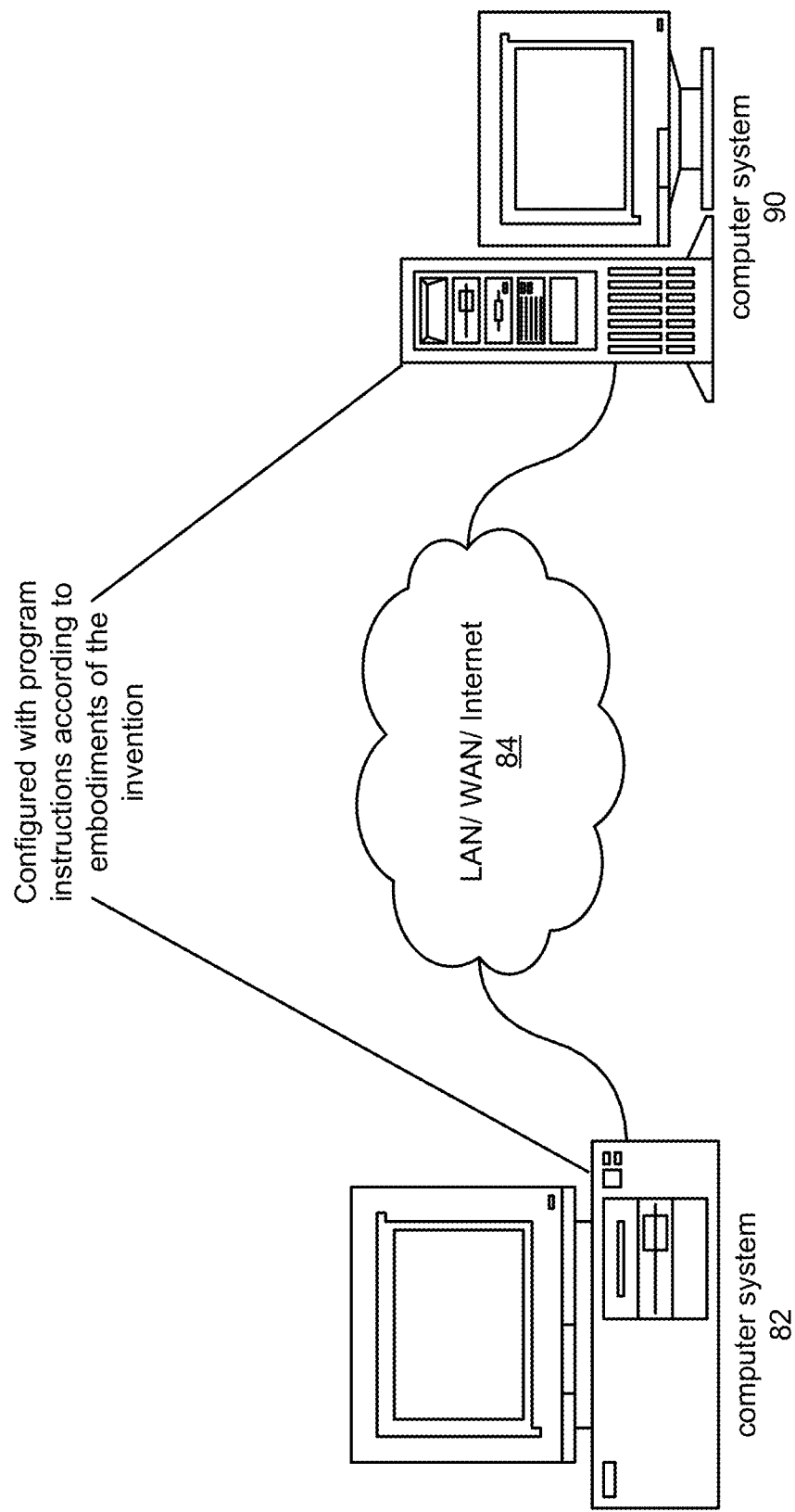
FIG. 1B illustrates a network system comprising two or more computer systems that may implement an embodiment of the present invention.

FIG. 1B—Computer Network

FIG. 1B illustrates a system including a first computer system 82 that is coupled to a second computer system 90. The computer system 82 may be coupled via a network 84 (or a computer bus) to the second computer system 90. The computer systems 82 and 90 may each be any of various types, as desired. The network 84 can also be any of various types, including a LAN (local area network), WAN (wide area network), the Internet, or an Intranet, among others. The computer systems 82 and 90 may be configured to execute a graphical program in a distributed fashion. For example, computer 82 may execute a first portion of the block diagram of a graphical program and computer system 90 may execute a second portion of the block diagram of the graphical program. As another example, computer 82 may display the graphical user interface of a graphical program and computer system 90 may execute the block diagram of the graphical program.

In one embodiment, the graphical user interface of the graphical program may be displayed on a display device of the computer system 82, and the block diagram may execute on a device coupled to the computer system 82. The device may include a programmable hardware element and/or may include a processor and memory medium which may execute a real time operating system. In one embodiment, the graphical program may be downloaded and executed on the device. For example, an application development environment with which the graphical program is associated may provide support for downloading a graphical program for execution on the device in a real time system. Note, however, that in various embodiments, any type of program may be used or analyzed as desired, e.g., textual or graphical programs.

Exemplary Systems

Embodiments of the present invention may be involved with performing test and/or measurement functions; controlling and/or modeling instrumentation or industrial automation hardware; modeling and simulation functions, e.g., modeling or simulating a device or product being developed or tested, etc. Exemplary test applications where the graphical program may be used include hardware-in-the-loop testing and rapid control prototyping, among others.

However, it is noted that embodiments of the present invention can be used for a plethora of applications and is not limited to the above applications. In other words, applications discussed in the present description are exemplary only, and embodiments of the present invention may be used in any of various types of systems. Thus, embodiments of the system and method of the present invention is configured to be used in any of various types of applications, including the control of other types of devices such as multimedia devices, video devices, audio devices, telephony devices, Internet devices, etc., as well as general purpose software applications such as word processing, spreadsheets, network control, network monitoring, financial applications, games, etc.

Figure 2A:
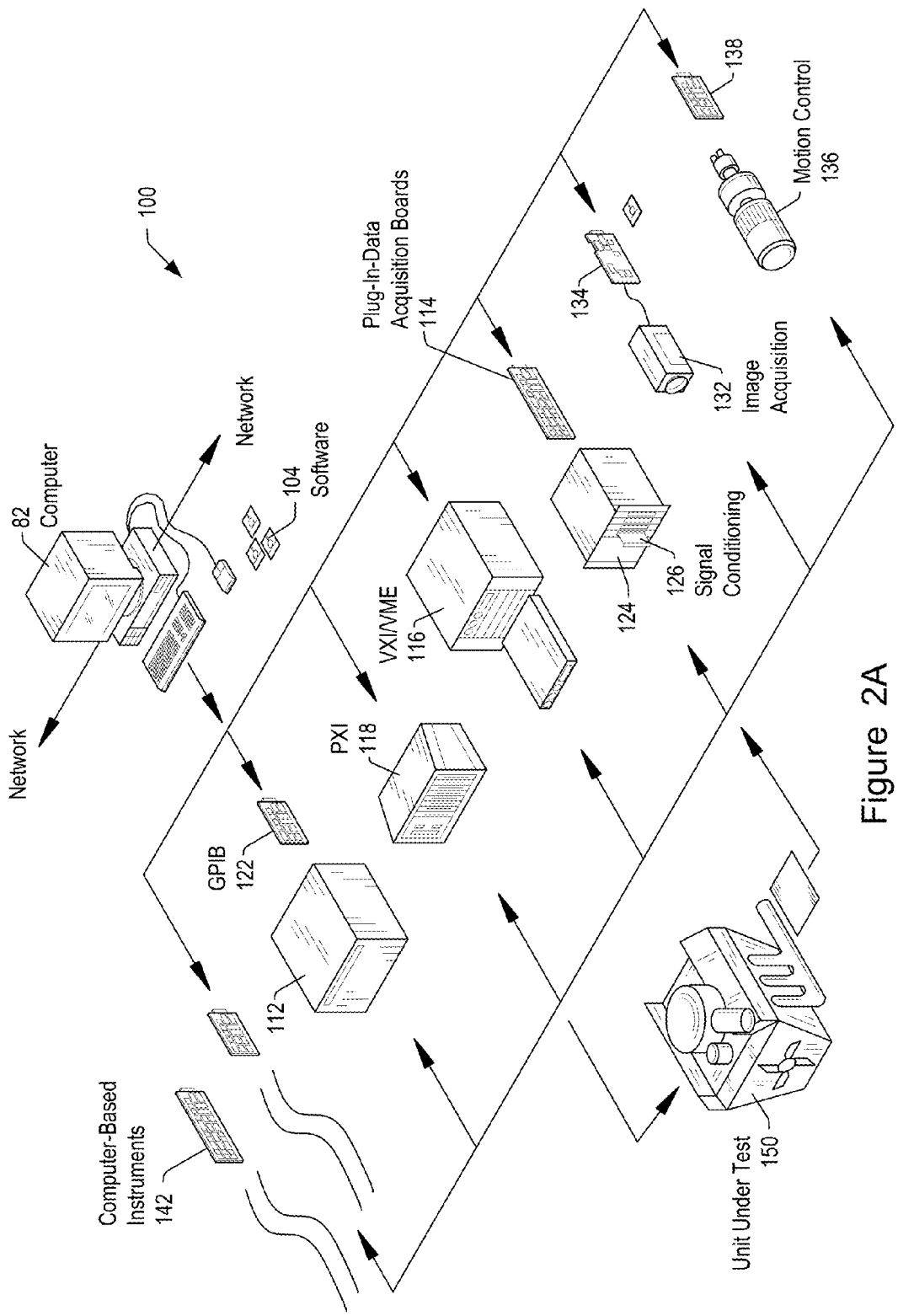
FIG. 2A illustrates an instrumentation control system according to one embodiment of the invention.

FIG. 2A illustrates an exemplary instrumentation control system 100 which may implement embodiments of the invention. The system 100 comprises a host computer 82 which couples to one or more instruments. The host computer 82 may comprise a CPU, a display screen, memory, and one or more input devices such as a mouse or keyboard as shown. The computer 82 may operate with the one or more instruments to analyze, measure or control a unit under test (UUT) or process 150, e.g., via execution of software 104.

The one or more instruments may include a GPIB instrument 112 and associated GPIB interface card 122, a data acquisition board 114 inserted into or otherwise coupled with chassis 124 with associated signal conditioning circuitry 126, a VXI instrument 116, a PXI instrument 118, a video device or camera 132 and associated image acquisition (or machine vision) card 134, a motion control device 136 and associated motion control interface card 138, and/or one or more computer based instrument cards 142, among other types of devices. The computer system may couple to and operate with one or more of these instruments. The instruments may be coupled to the unit under test (UUT) or process 150, or may be coupled to receive field signals, typically generated by transducers. The system 100 may be used in a data acquisition and control application, in a test and measurement application, an image processing or machine vision application, a process control application, a man-machine interface application, a simulation application, or a hardware-in-the-loop validation application, among others.

Figure 2B:
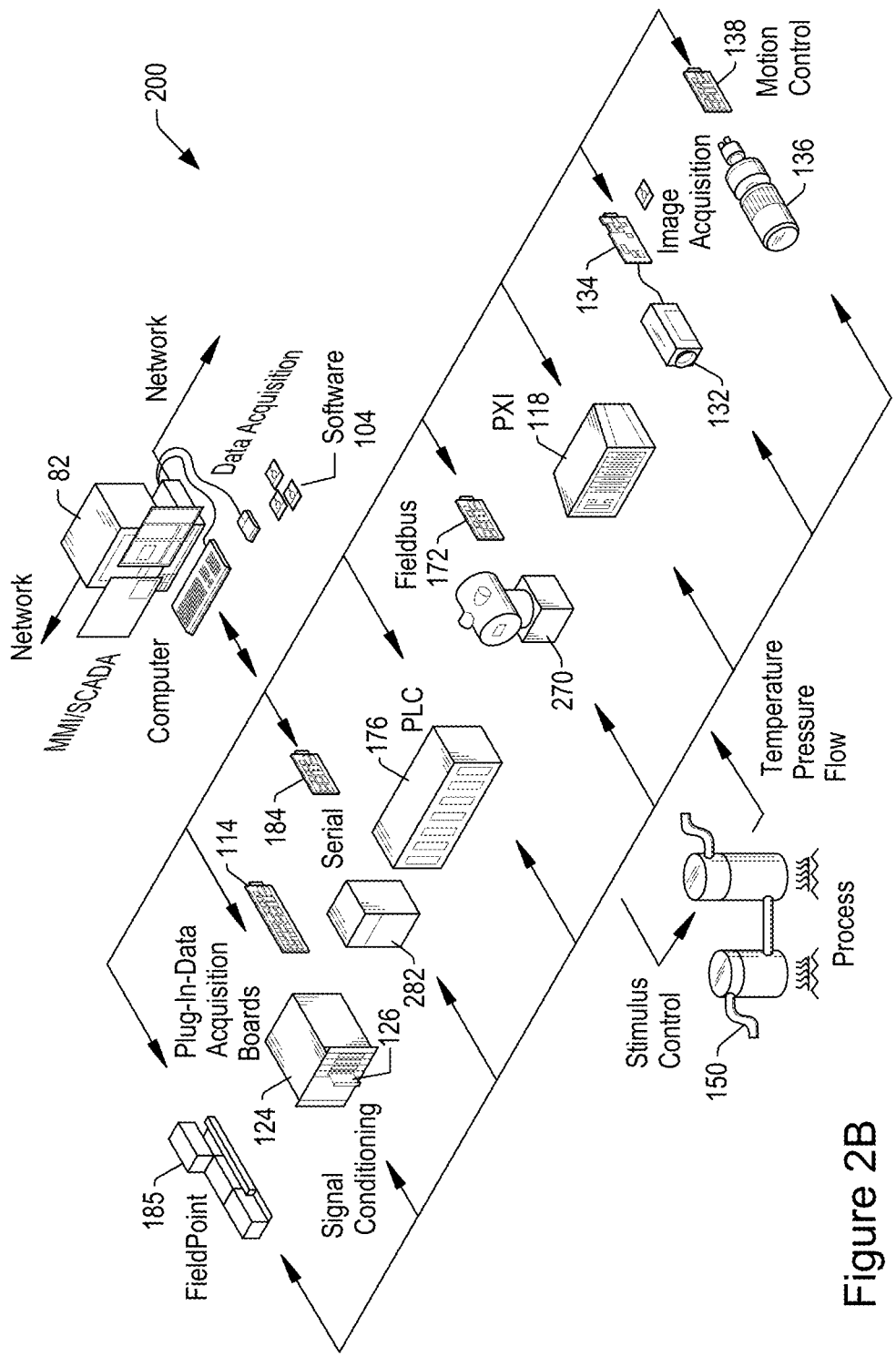
FIG. 2B illustrates an industrial automation system according to one embodiment of the invention.

FIG. 2B illustrates an exemplary industrial automation system 200 which may implement embodiments of the invention. The industrial automation system 200 is similar to the instrumentation or test and measurement system 100 shown in FIG. 2A. Elements which are similar or identical to elements in FIG. 2A have the same reference numerals for convenience. The system 200 may comprise a computer 82 which couples to one or more devices or instruments. The computer 82 may comprise a CPU, a display screen, memory, and one or more input devices such as a mouse or keyboard as shown. The computer 82 may operate with the one or more devices to perform an automation function with respect to a process or device 150, such as MIMI (Man Machine Interface), SCADA (Supervisory Control and Data Acquisition), portable or distributed data acquisition, process control, advanced analysis, or other control, among others, e.g., via execution of software 104.

The one or more devices may include a data acquisition board 114 inserted into or otherwise coupled with chassis 124 with associated signal conditioning circuitry 126, a PXI instrument 118, a video device 132 and associated image acquisition card 134, a motion control device 136 and associated motion control interface card 138, a fieldbus device 270 and associated fieldbus interface card 172, a PLC (Programmable Logic Controller) 176, a serial instrument 282 and associated serial interface card 184, or a distributed data acquisition system, such as Fieldpoint system 185, available from National Instruments Corporation, among other types of devices.

Figure 3A:
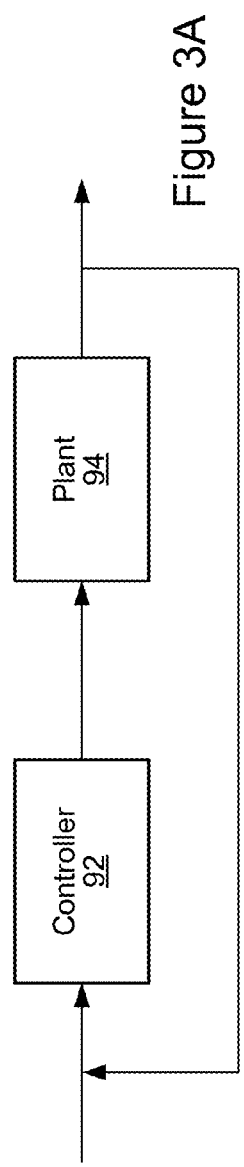
FIG. 3A is a high level block diagram of an exemplary system which may execute or utilize graphical programs.

FIG. 3A is a high level block diagram of an exemplary system which may execute or utilize graphical programs. FIG. 3A illustrates a general high-level block diagram of a generic control and/or simulation system which comprises a controller 92 and a plant 94. The controller 92 represents a control system/algorithm the user may be trying to develop. The plant 94 represents the system the user may be trying to control. For example, if the user is designing an ECU for a car, the controller 92 is the ECU and the plant 94 is the car's engine (and possibly other components such as transmission, brakes, and so on.) As shown, a user may create a graphical program that specifies or implements the functionality of one or both of the controller 92 and the plant 94. For example, a control engineer may use a modeling and simulation tool to create a model (graphical program) of the plant 94 and/or to create the algorithm (graphical program) for the controller 92.

Figure 3B:
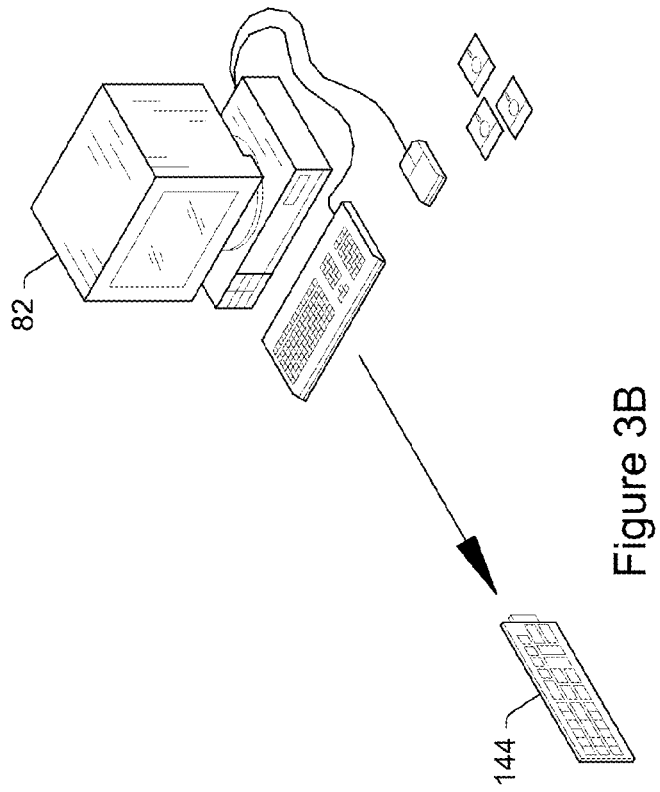
FIG. 3B illustrates an exemplary system which may perform control and/or simulation functions utilizing graphical programs.

FIG. 3B illustrates an exemplary system which may perform control and/or simulation functions. As shown, the controller 92 may be implemented by a computer system 82 or other device (e.g., including a processor and memory medium and/or including a programmable hardware element) that executes or implements a graphical program. In a similar manner, the plant 94 may be implemented by a computer system or other device 144 (e.g., including a processor and memory medium and/or including a programmable hardware element) that executes or implements a graphical program, or may be implemented in or as a real physical system, e.g., a car engine.

In one embodiment of the invention, one or more graphical programs may be created which are used in performing rapid control prototyping. Rapid Control Prototyping (RCP) generally refers to the process by which a user develops a control algorithm and quickly executes that algorithm on a target controller connected to a real system. The user may develop the control algorithm using a graphical program, and the graphical program may execute on the controller 92, e.g., on a computer system or other device. The computer system 82 may be a platform that supports real time execution, e.g., a device including a processor that executes a real time operating system (RTOS), or a device including a programmable hardware element.

In one embodiment of the invention, one or more graphical programs may be created which are used in performing Hardware in the Loop (HIL) simulation. Hardware in the Loop (HIL) refers to the execution of the plant model 94 in real time to test operation of a real controller 92. For example, once the controller 92 has been designed, it may be expensive and complicated to actually test the controller 92 thoroughly in a real plant, e.g., a real car. Thus, the plant model (implemented by a graphical program) is executed in real time to make the real controller 92 "believe" or operate as if it is connected to a real plant, e.g., a real engine.

In the embodiments of FIGS. 2A, 2B, and 3B above, one or more of the various devices may couple to each other over a network, such as the Internet. In one embodiment, the user operates to select a target device from a plurality of possible target devices for programming or configuration using a graphical program. Thus the user may create a graphical program on a computer and use (execute) the graphical program on that computer or deploy the graphical program to a target device (for remote execution on the target device) that is remotely located from the computer and coupled to the computer through a network.

Graphical software programs which perform data acquisition, analysis and/or presentation, e.g., for measurement, instrumentation control, industrial automation, modeling, or simulation, such as in the applications shown in FIGS. 2A and 2B, may be referred to as virtual instruments (VIs).

Figure 4:
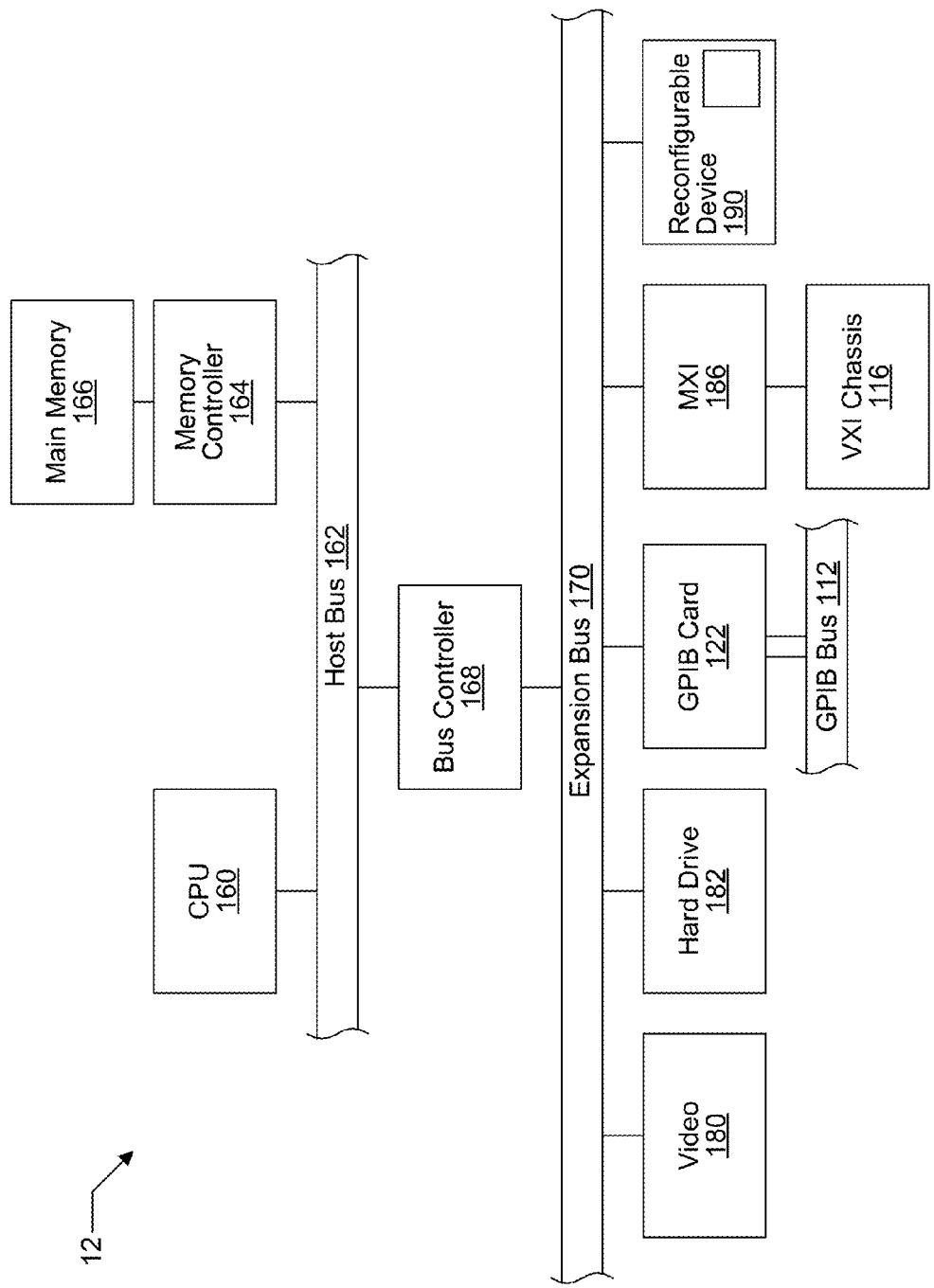
FIG. 4 is an exemplary block diagram of the computer systems of FIGS. 1A, 1B, 2A and 2B and 3B.

FIG. 4—Computer System Block Diagram

FIG. 4 is a block diagram 12 representing one embodiment of the computer system 82 and/or 90 illustrated in FIGS. 1A and 1B, or computer system 82 shown in FIG. 2A or 2B. It is noted that any type of computer system configuration or architecture can be used as desired, and FIG. 4 illustrates a representative PC embodiment. It is also noted that the computer system may be a general purpose computer system, a computer implemented on a card installed in a chassis, or other types of embodiments. Elements of a computer not necessary to understand the present description have been omitted for simplicity.

The computer may include at least one central processing unit or CPU (processor) 160 which is coupled to a processor or host bus 162. The CPU 160 may be any of various types, including an x86 processor, e.g., a Pentium class, a PowerPC processor, a CPU from the SPARC family of RISC processors, as well as others. A memory medium, typically comprising RAM and referred to as main memory, 166 is coupled to the host bus 162 by means of memory controller 164. The main memory 166 may store one or more programs configured to perform correlation analysis on program structures, according to the present techniques. The main memory may also store operating system software, as well as other software for operation of the computer system.

The host bus 162 may be coupled to an expansion or input/output bus 170 by means of a bus controller 168 or bus bridge logic. The expansion bus 170 may be the PCI (Peripheral Component Interconnect) expansion bus, although other bus types can be used. The expansion bus 170 includes slots for various devices such as described above. The computer 82 further comprises a video display subsystem 180 and hard drive 182 coupled to the expansion bus 170. The computer 82 may also comprise a GPIB card 122 coupled to a GPIB bus 112, and/or an MXI device 186 coupled to a VXI chassis 116.

As shown, a device 190 may also be connected to the computer. The device 190 may include a processor and memory which may execute a real time operating system. The device 190 may also or instead comprise a programmable hardware element. The computer system may be configured to deploy a graphical program to the device 190 for execution of the graphical program on the device 190. The deployed graphical program may take the form of graphical program instructions or data structures that directly represents the graphical program. Alternatively, the deployed graphical program may take the form of text code (e.g., C code) generated from the graphical program. As another example, the deployed graphical program may take the form of compiled code generated from either the graphical program or from text code that in turn was generated from the graphical program.

Figure 5:
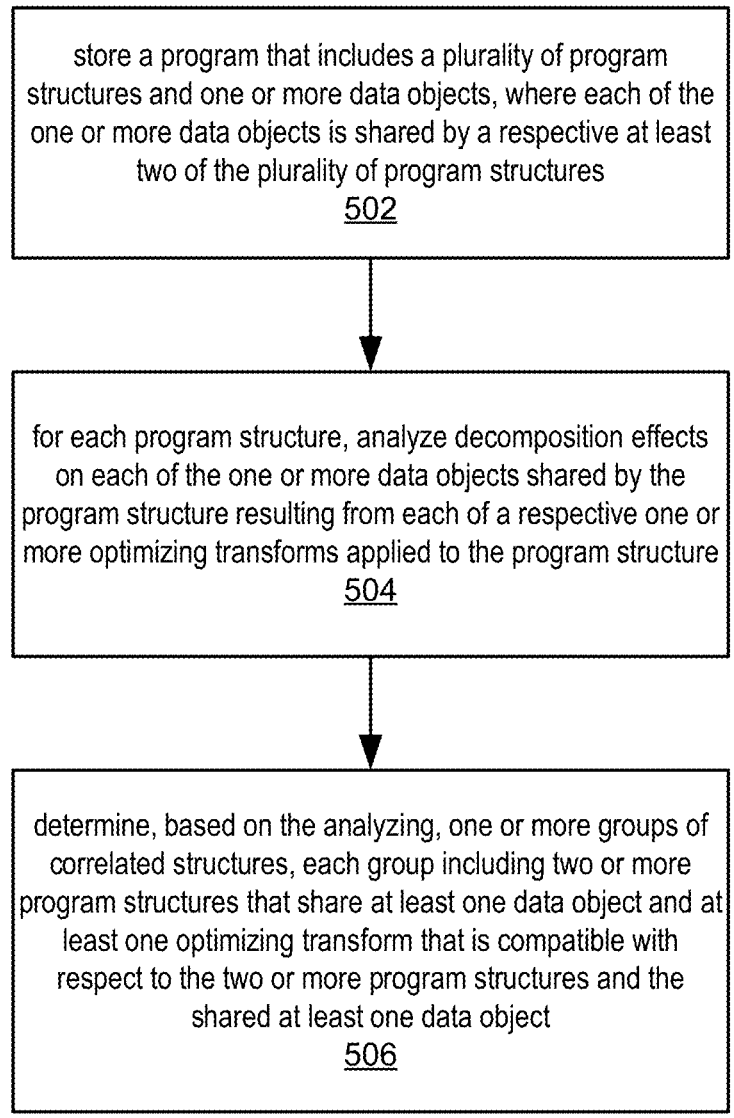
FIG. 5 is a flowchart diagram illustrating one embodiment of a method for correlation analysis of program structures.

FIG. 5—Flowchart of a Method for Correlation Analysis of Program Structures

FIG. 5 illustrates a method for performing correlation analysis of program structures, according to one embodiment. The method shown in FIG. 5 may be used in conjunction with any of the computer systems or devices shown in the above Figures, among other devices. In various embodiments, some of the method elements shown may be performed concurrently, in a different order than shown, or may be omitted. Additional method elements may also be performed as desired. As shown, this method may operate as follows.

In 502, a program that includes a plurality of program structures and one or more data objects may be stored, e.g., in a memory medium. Each of the one or more data objects may be shared by a respective at least two of the plurality of program structures. In other words, in the program, each data object is operated on or processed by at least two of the program structures. The program may be of any type desired. For example, the program may include one or more of: a data flow program, a graphical program, a graphical data flow program, or a hardware description program, among others. Further examples of contemplated program types include, but are not limited to, one or more of: a procedural program, a functional program, a textual program, or a declarative program.

As used herein, the term "program structure" refers to program elements that process data objects. Examples of program structures include, but are not limited to, loops, e.g., FOR loops, WHILE loops, UNTIL loops, as well as case functions (i.e., case/switch statements), procedures, and subroutines, e.g., LabVIEW subVIs, which are graphical subprograms. Combinations of such structures are also contemplated. For example, in some embodiments, the plurality of program structures may include one or more of: at least one nested program structure, at least one cascaded program structure, two or more parallel program structures, or a combination of at least two of the at least one nested program structure, the at least one cascaded program structure, or the two or more parallel program structures. Thus, in some embodiments, there may be hierarchical or otherwise complex program structures with multiple levels of nesting, parallelism, or cascading, as desired.

As used herein, the term "data object" refers to any type of variable or data structure, including, but not limited to, any of: a static or global variable, an array, a cluster, struct, or record, and combinations and nestings thereof, e.g., an array of arrays, clusters, structs, or records, a cluster of arrays, a struct of arrays, a record of arrays, and so forth. Thus, the meaning of "data object" is not limited to object oriented (data) objects.

In 504, for each program structure of the plurality of program structures, the method may analyze decomposition effects on each of the one or more data objects shared by the program structure resulting from each of a respective one or more optimizing transforms applied to the program structure. Said another way, for each of the program structures, the method may determine the effects on (one or more) shared data objects of applying optimizing transforms to the program structure (that shares the data objects), where the particular effects analyzed are decomposition effects, e.g., the results of splitting, partitioning, or otherwise modifying data objects as a consequence of applying the optimizing transform(s) to the program structure. Examples of decomposition effects include, but are not limited to, arrays resulting from array partitioning, arrays resulting from array jamming, arrays resulting from array copying, arrays resulting from array remapping, arrays resulting from array linearization (e.g. from a 2 dimensional (2D) array down to 1D array), scalar data objects resulting from scalarization of array, cluster, record, or struct, number of bits required to store and represent data objects, array sizes required to store and represent arrays, estimated performance metric(s) (e.g., throughput, latency, power), estimated resource usage metric(s) (e.g. FPGA resource utilization, ASIC gate count), maximum path length in dataflow graphs, cycle path length in feedback loops in dataflow graphs, or numbers of nodes or edges in dataflow graphs, among others.

In one embodiment, analyzing decomposition effects of each of the respective one or more optimizing transforms may include, for at least one transform of the respective one or more optimizing transforms: applying a corresponding transform to a model of the program structure and the at least one data object, wherein the applying generates estimated decomposition effects of the at least one transform, and analyzing the estimated decomposition effects. In other words, rather than applying the transform to the program structure to determine the decomposition effects, a simpler (and thus, faster) process is used, where a different transform (that corresponds to the transform) is applied to a model of the program structure and the data object to generate an estimate (or projection or prediction) of the decomposition effects of the at least one transform (on the data object). In one embodiment, a module, e.g., design planning module, may be included in a compiler, where the module calculates these estimated or projected effects based on simplified program structures and/or data objects (i.e., the model), i.e., the module may execute (during or in association with compilation) the model to produce the estimate(s) of decomposition effects.

Moreover, in one embodiment, the method may include analyzing the program structure and the at least one data object, and generating (or extracting) the model of the program structure and/or the at least one data object based on the analysis. Further information regarding the model(s) is provided below with reference to FIGS. 7A and 7B.

In one embodiment, the analyzing of 504 may be performed in context of the program structure and independent of other program structures in the program. In other words, the decomposition effects may be analyzed with respect to the (currently considered) program structure without regard to the other program structures in the program.

In 506, one or more groups of correlated structures may be determined based on the analyzing of 504. Each group of correlated structures may include two or more program structures that share at least one data object, and at least one optimizing transform that is compatible with respect to the two or more program structures and the shared at least one data object. In other words, a group of correlated structures has a(t least one) respective optimizing transform that is compatible with respect to program structures in the group regarding the shared data object. For at least one group of correlated structures, the at least one optimizing transform may be usable to transform the two or more program structures to meet a specified optimization objective.

In various embodiments, the respective one or more optimizing transforms may include at least one of: loop unrolling, loop merging, loop splitting, loop peeling, rewriting a WHILE loop as a FOR loop with conditional exit, code motion, code outlining, code clumping, or in-lining a subprogram, function, or procedure, among others.

The specified optimization objective may be of any type desired, depending on the application. For example, the specified optimization objective may be with respect to, but is not limited to, optimization of one or more of: run time, compile time, code size, memory footprint size, stack size, processor concurrency (e.g., on multicore processors of desktop or real time (RT) platforms), programmable hardware element (PHE) or application specific integrated circuit (ASIC) resource utilization, PHE or ASIC compile time, PHE bitfile size, ASIC netlist file size, PHE or ASIC clock rate, PHE or ASIC throughput, PHE or ASIC latency, or PHE or ASIC I/O sampling rate, among others. In other words, the optimization objective may be to extremize (i.e., minimize or maximize) one or more parameters, attributes, or metrics, regarding the program and/or its implementation, as desired. In some embodiments, at least one of the respective one or more optimizing transforms is or includes a combination of optimizing transforms. Thus, one or more of the optimizing transforms may be a compound transform.

Note that in some embodiments, further analysis may be performed to optimize the program. For example, in one embodiment, the one or more groups of correlated structures may include a plurality of groups of correlated structures, where two or more of the groups of correlated structures share a program structure. The two or more of the groups of correlated structures may be analyzed, and based on this further analyzing, a determination may be made as to whether the respective at least one optimizing transform of at least one of the two or more groups of correlated structures is compatible with respect to the other groups of the two or more groups of correlated structures. Said another way, the plurality of groups of correlated structures may be analyzed to determine whether the at least one optimizing transform (of at least one of the two or more groups of correlated structures) is applicable to the program structure(s) of other groups of correlated structures without causing conflicting decomposition effects on the associated data objects of those groups.

In one embodiment, the at least one optimizing transform may be determined to be compatible with the two or more program structures and the shared at least one data object when the respective decomposition effects of the at least one optimizing transform on the shared at least one data object with respect to the two or more program structures have at least one of the following relationships: equality, less than, or less than or equal to, greater than, or greater than or equal to, implied by, subsumed by, non-overlapping, or non-intersecting. Further description of the term "compatible" is provided above in the Terms section.

In one exemplary set of embodiments, the method may determine, based on this analysis of the two or more of the groups of correlated structures, that a first respective at least one optimizing transform of one of the two or more groups of correlated structures is compatible with respect to all other groups of the two or more groups of correlated structures. The first respective at least one optimizing transform may be usable to transform the respective two or more program structures and the at least one data object of each of the two or more groups of correlated structures to meet the specified optimization objective.

In another embodiment, the method may determine, based on this analyzing (of the two or more of the groups of correlated structures), that a respective at least one optimizing transform of at least two of the two or more groups of correlated structures is compatible with all other groups of the two or more groups of correlated structures, and may analyze each of the respective at least one optimizing transforms of the at least two of the two or more groups of correlated structures. The method may then select a first respective at least one optimizing transform based on the analyzing each of the respective at least one optimizing transforms. The first respective at least one optimizing transform may be usable to transform the respective two or more program structures and the at least one data object of each of the two or more groups of correlated structures to meet the specified optimization objective.

Accordingly, in some embodiments, the method may include, for the at least one group of correlated structures, applying the at least one optimizing transform to the two or more program structures and the at least one data object to meet the specified optimization objective.

Note, however, that in at least one embodiment, the method may determine, based on the analyzing the two or more of the groups of correlated structures, that no respective optimizing transform of each of the two or more groups of correlated structures is compatible with all other groups of the two or more groups of correlated structures, and may indicate that the respective optimizing transforms of the two or more groups are incompatible for use in transforming the program structures and data objects of the two or more groups. For example, an indication may be output, e.g., to a log file, report, or to a display, or, as another exemplary example, indications may be displayed in the program itself.

The method may further include compiling the program, including generating code configured to run on one or more of: a desktop computer with one or more central processing unit (CPU) cores, an embedded computer with one or more CPU cores, a graphics processing unit (GPU), an embedded GPU, a field programmable gate array (FPGA), or an application specific integrated circuit (ASIC).

In one embodiment, some or all of the method elements discussed above may be performed as part of the compilation process, although in other embodiments, the method may be performed prior to compilation of the program.

Walk-Through Example

FIGS. 6A-6F illustrate an exemplary walk-through example of the techniques discussed herein.

Figure 6A:
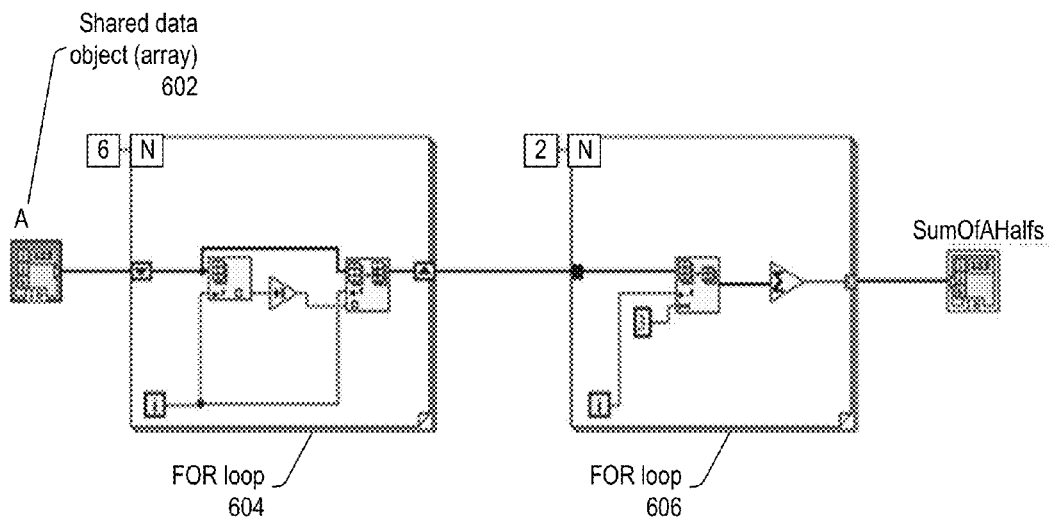
FIG. 6A illustrates an exemplary graphical program that contains two program structures that share a single shared data object, according to one embodiment.

FIG. 6A shows an example graphical program that contains two (e.g., first and second) program structures that share a single shared data object 602, specifically, an array A of size 6. More specifically, the first program structure 604 is a FOR loop that has iteration count of 6, configured to iteratively read, modify, and write every element in the array A. Two exemplary optimizing transforms that may be applied to this FOR loop are: unroll-by-2, and unroll-by-3, because 6 is evenly divisible by 2 and by 3.

Figure 6B:
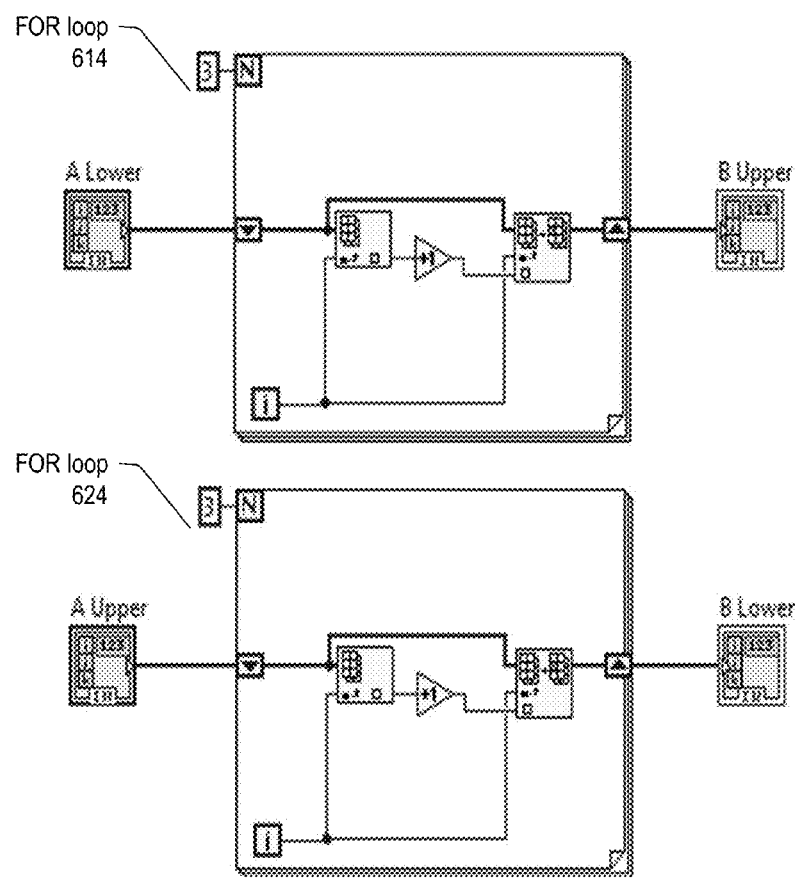
FIG. 6B illustrates exemplary results of applying an unroll-by-2 optimizing transform to the first FOR loop of FIG. 6A, according to one embodiment.

FIG. 6B illustrates exemplary results of applying the unroll-by-2 optimizing transform to the first FOR loop 604 of FIG. 6A. As may be seen, the original loop has been replaced by two FOR loops 614 and 624, each with a loop iteration count of 3, and the original Array A 602 in the original FOR loop has been partitioned into two smaller arrays, each of size 3, labeled "A Upper" and "A Lower", respectively. The top FOR loop 614 in FIG. 6B reads, modifies, and writes to the partitioned array A Lower, while the bottom FOR loop in FIG. 6B reads, modified, and writes to the partitioned array A Upper. So the effect of this transform is to partition array A into 2 equal sized arrays A Lower and A Upper.

Figure 6C:
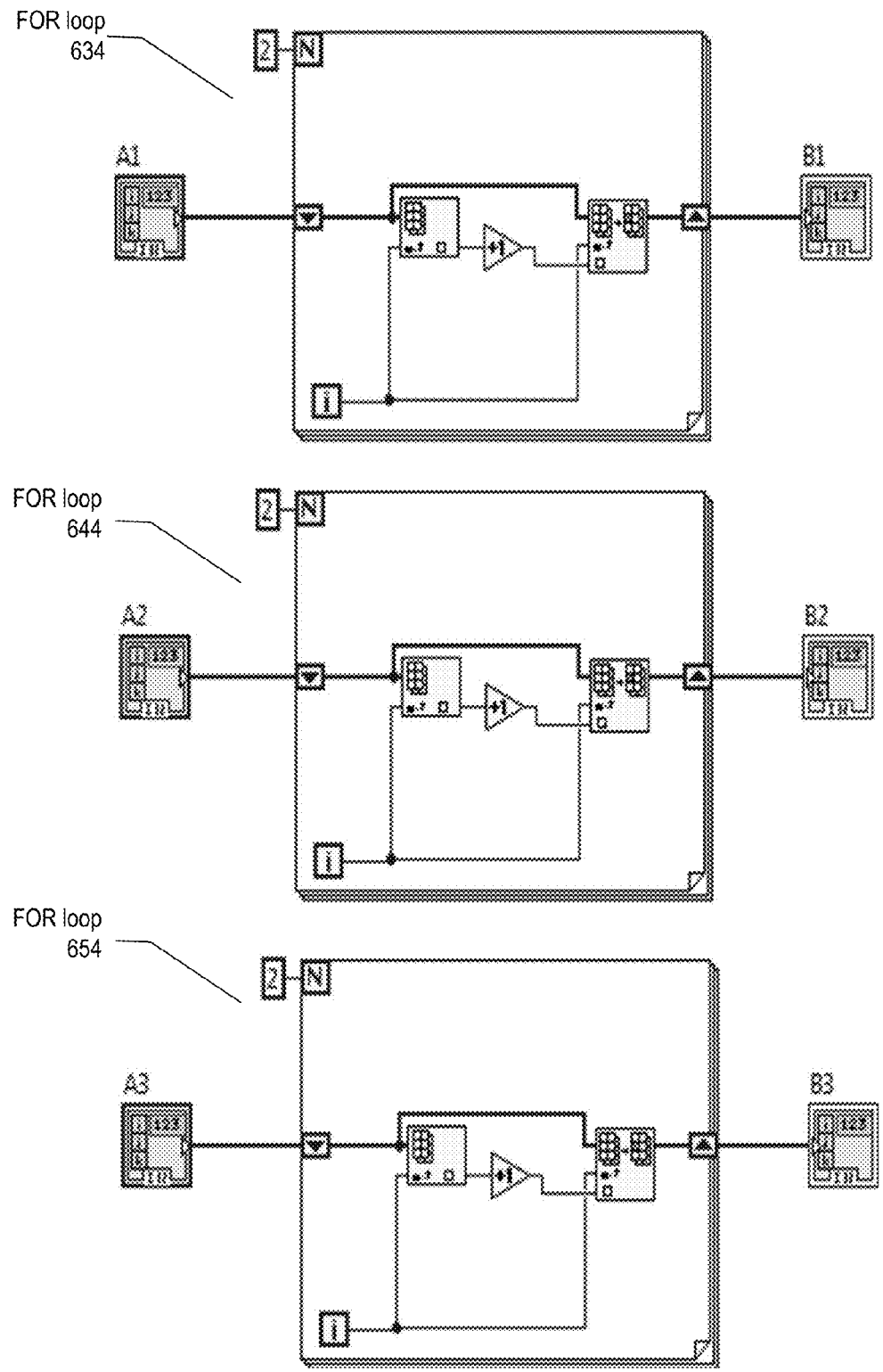
FIG. 6C illustrates exemplary results of applying an unroll-by-3 optimizing transform to the first FOR loop of FIG. 6A, according to one embodiment.

FIG. 6C illustrates exemplary effects of applying the unroll-by-3 transform to the first FOR loop. In this exemplary case, the original FOR loop 604 of iteration count of 6 has been replaced by three FOR loops (634, 644, and 654), each of iteration count of 2, where each FOR loop reads, modifies, and writes a smaller array of size 2. The original array A 602 has been partitioned into three arrays, labeled A1, A2, and A3, of size 2 each. So the effect of this transform is to partition the array A 602 into three equal sized arrays A1, A2 and A3.

Now, turning back to FIG. 6A, consider the second program structure 606 (on the right in FIG. 6A). This program structure is a FOR loop of iteration count of 2 which iteratively sums a 3-element subset of the array A 602 after that array has been modified by the first FOR loop 604. For this FOR loop of iteration count of 2, the only unrolling transform available is unroll-by-2.

Figure 6D:
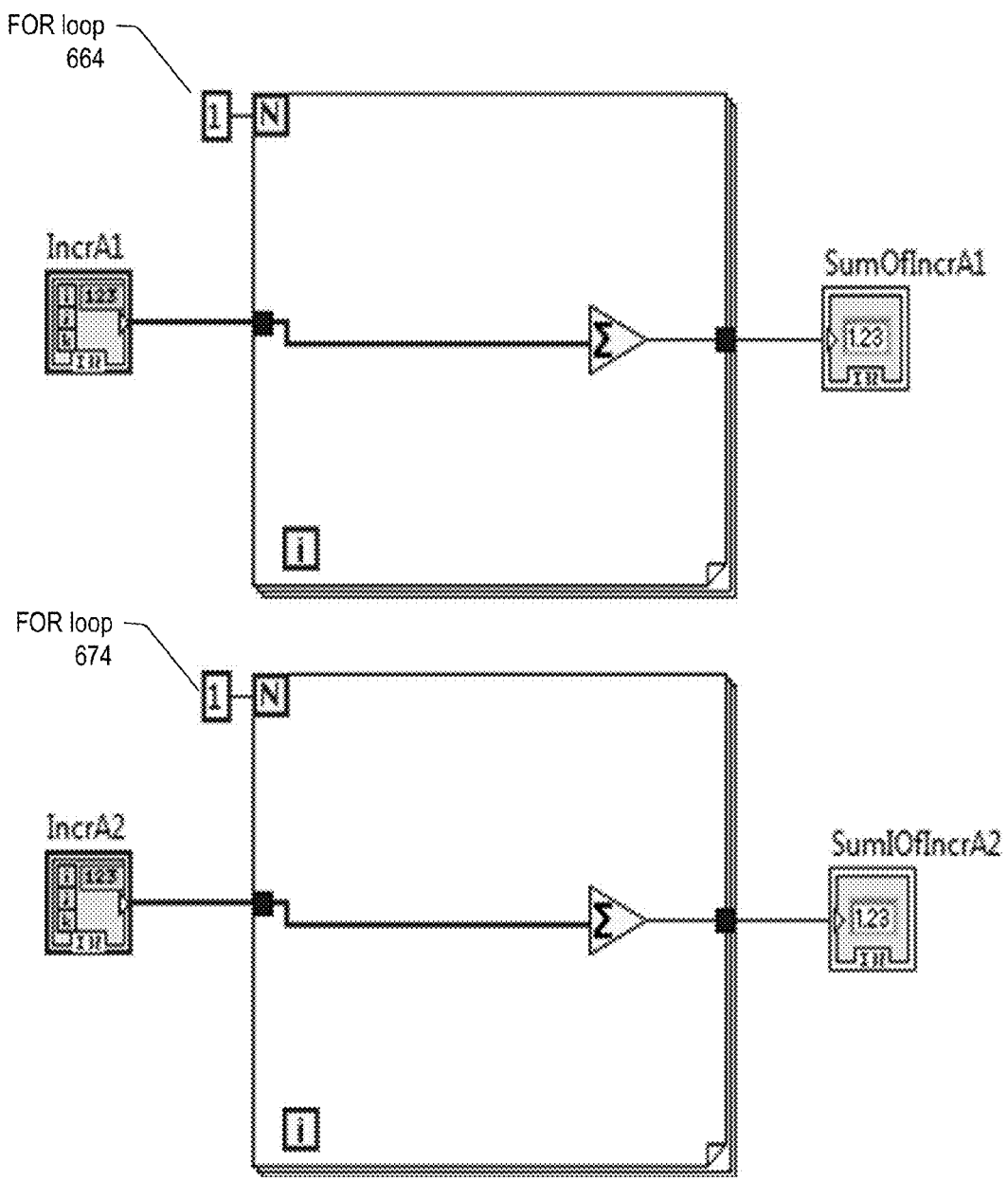
FIG. 6D illustrates exemplary results of applying the unroll-by-2 optimizing transform to the second FOR loop of FIG. 6A, according to one embodiment.

FIG. 6D illustrates the effects of applying the unroll-by-2 optimizing transform to the second FOR loop 606 of FIG. 6A. As may be seen, the original (second) FOR loop 606 has been replaced by 2 single-iteration FOR loops (664 and 674, respectively), and the original array A 602 has been partitioned into 2 smaller arrays labeled "IncrA1" and "IncrA2", each of size 3. The 2 single-iteration FOR loops compute the sums of their respective smaller arrays. Thus, the effect of this transform is to partition the original array A into 2 equal sized arrays, IncrA1 and IncrA2, each of size 3.

Thus, summarizing the above, per the above described method of FIG. 5, in some embodiments of the correlation analysis techniques disclosed herein, the program structures that share one or more data structure may first be identified. Accordingly, in the exemplary walk-through example of FIGS. 6A-6F, the first and second FOR loops 604 and 606, which share the same array A (data object 602), may be identified, and grouped into the same correlated group. For each program structure in this correlated group, various possible optimizing transforms may be analyzed, and their effects on the shared data structure determined. In this example, the possible transforms for the first FOR loop 604 are: unroll-by-2 and unroll-by-3, and their respective effects on the shared data object 602 (array A) are: partition into two arrays, and partition into three arrays. On the other hand, there is only one possible transform for the second FOR loop 606, namely unroll-by-2, whose effect on the shared data object 602 (array A) is to partition it into two arrays.

Then, compatible effects of the shared data object may be checked to determine the qualified set of optimizing transforms on program structures in the correlated group. In this example, since array A cannot be partitioned into both two and three smaller arrays at the same time, the transform unroll-by-3 for the first FOR loop 604 may be discarded (or removed from consideration). Therefore, the qualified set of transforms for this correlation group is: apply unroll-by-2 on the first FOR loop 604, and apply unroll-by-2 on the second FOR loop 606.

Figure 6E:
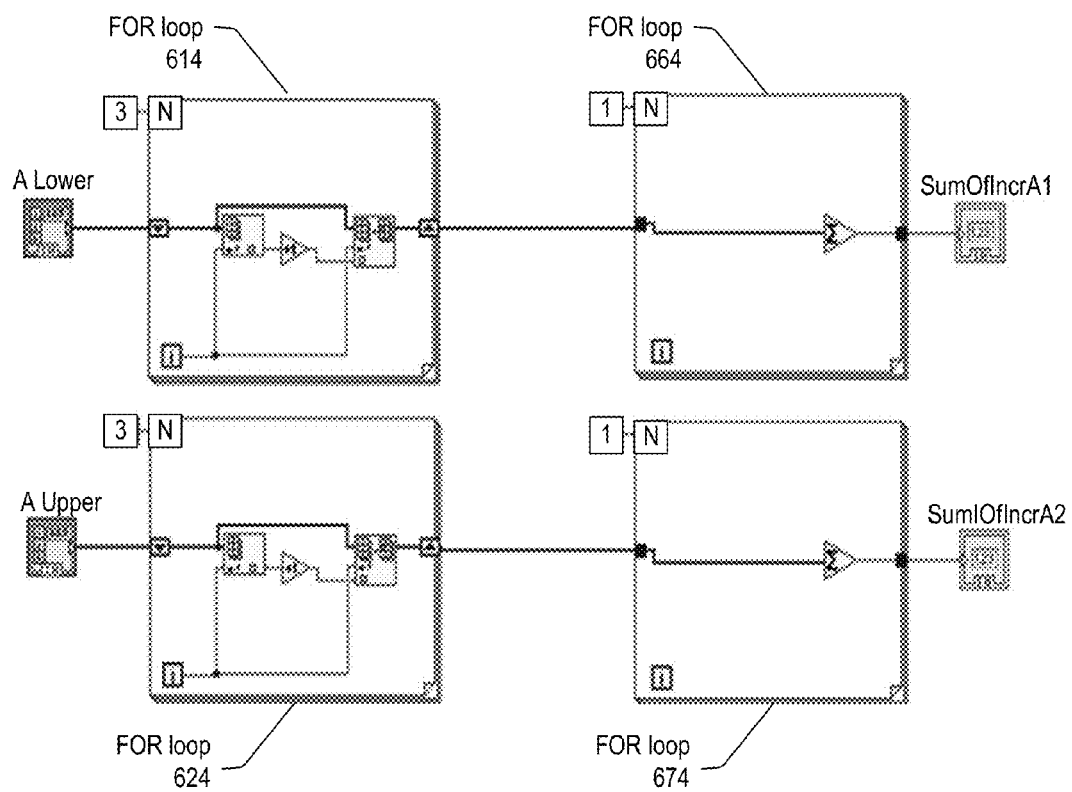
FIG. 6E illustrates an exemplary end result of applying the unroll-by-2 transform to each of the FOR loops of FIG. 6A, according to one embodiment.

FIG. 6E shows the end result of this transform applied to the program of FIG. 6A.

Figure 6F:
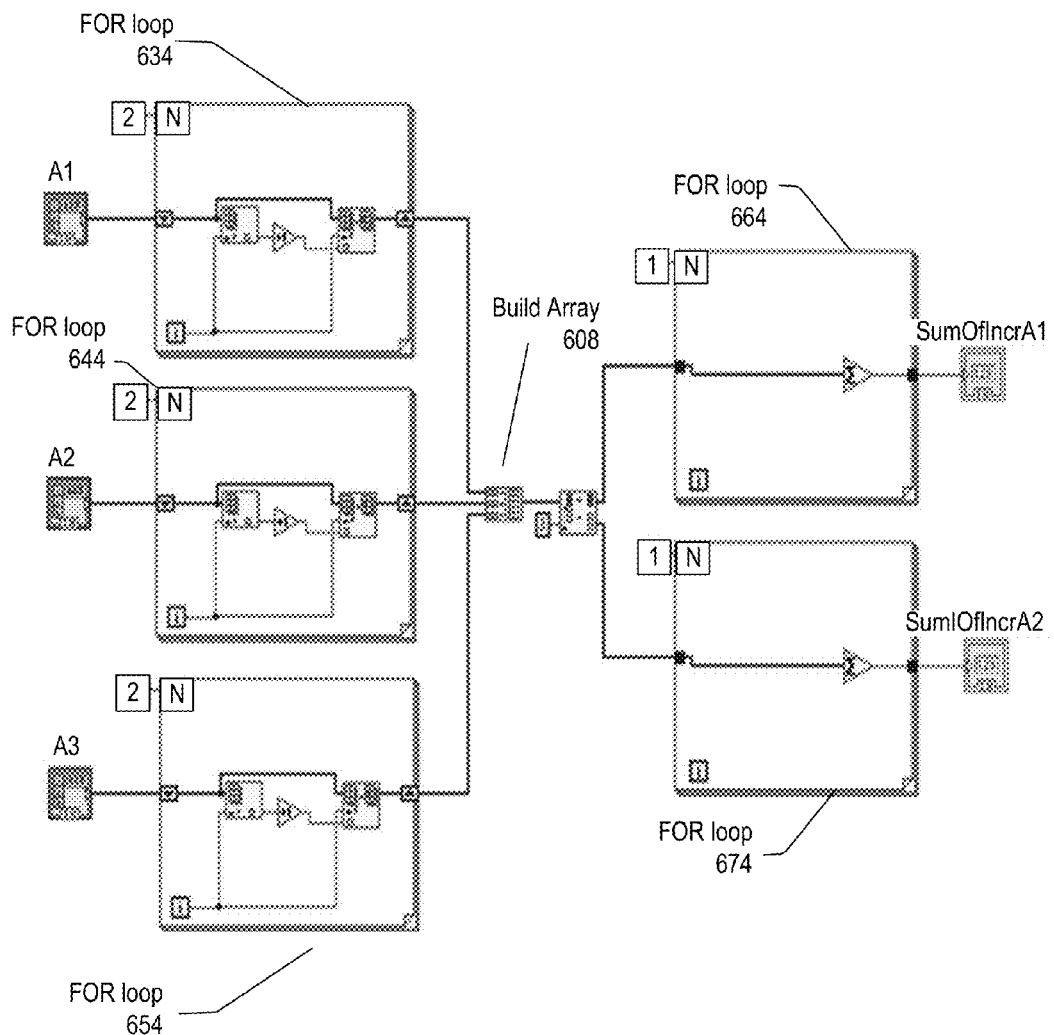
FIG. 6F illustrates an exemplary result of applying incompatible transforms to the FOR loops of FIG. 6A, according to one embodiment.

In contrast, without employing the above correlation analysis, the unroll-by-3 transform might (erroneously) be applied to the first FOR loop 604 and the unroll-by-2 transform might be applied to the second FOR loop 606 independently, resulting in the program structures shown in FIG. 6F, in which the effect of partitioning array A (data object 602) into three arrays by the unroll-by-3 transform on the first FOR loop 604, and the effect of partitioning array A (data object 602) into two arrays by the unroll-by-2 transform on the second FOR loop 606 are incompatible, resulting in a "Build Array" program structure 608 inserted in between these 2 sets of unrolled loops, and negating any performance benefit of the unrolling transforms in the original program.

Exemplary Model Generation Walk-Through

As noted above, in some embodiments, decomposition effects of a transform may be estimated (i.e., predicted or projected) by a corresponding transform applied to a model, e.g., an extracted or generated model, of the program structures and data object.

Figure 7A:
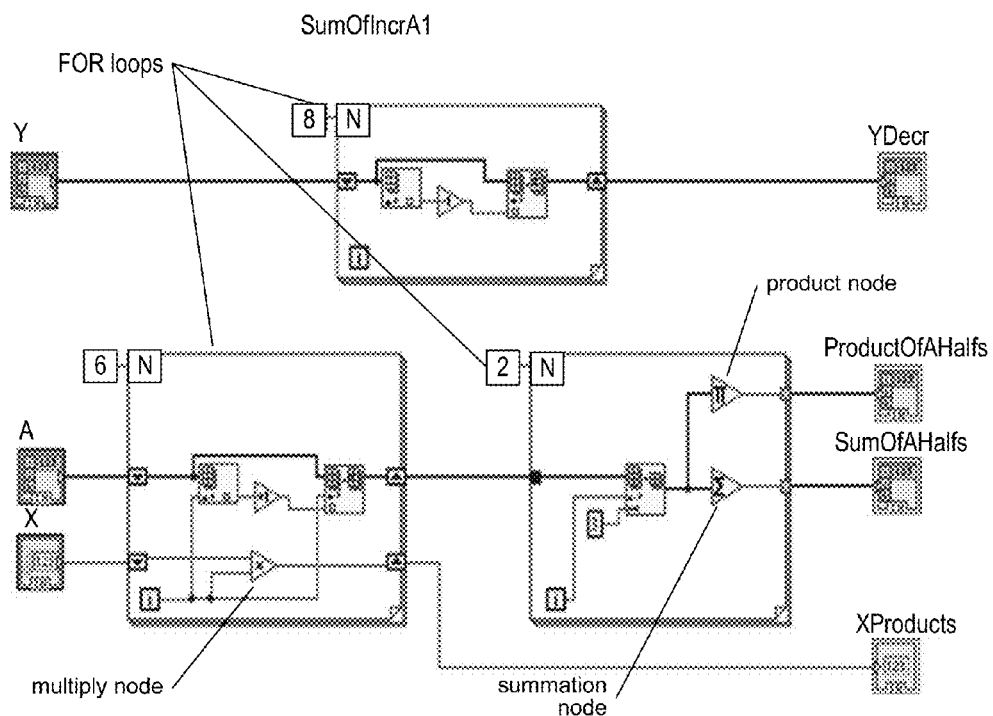
FIGS. 7A and 7B respectively illustrate an exemplary graphical first program, and an exemplary graphical second program, according to one embodiment.
Figure 7B:
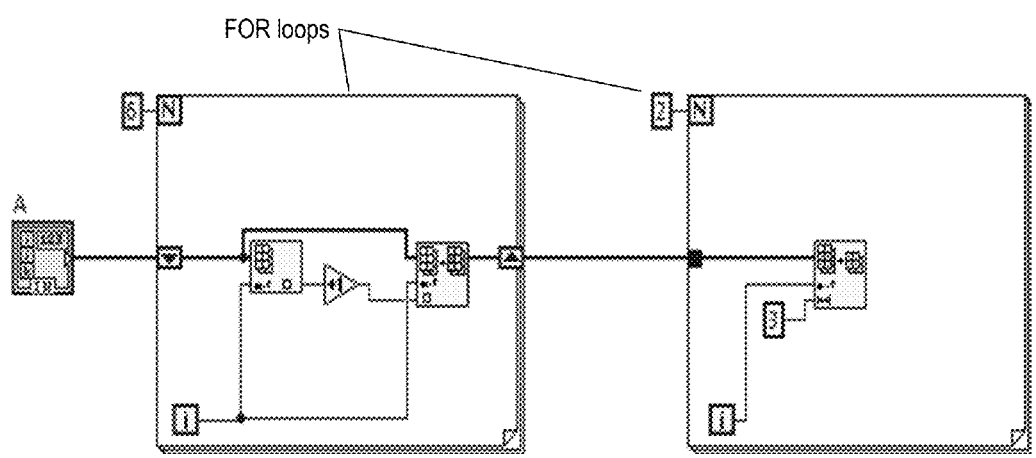

FIGS. 7A and 7B illustrate exemplary generation (or extraction) of such a model, according to one embodiment.

FIG. 7A illustrates an exemplary program that contains three FOR loops, three inputs, labeled "Y", "A", and X", and four outputs, labeled "YDec", "ProductOfAHalfs", "SumOfAHalfs", and "XProducts". As also shown, this exemplary program also includes a multiply node Now, the above described correlation analysis can be performed on this program directly, but it may be advantageous to reduce the program to a smaller (and simpler) program first, perform correlation analysis on this smaller program, and then use the results of this analysis, e.g., which transforms should be applied to which correlated groups, and use the results in transforming the original program.

This smaller program (i.e., the "extracted model" of the program, which may be referred to as the model or the model program) may be constructed (or extracted) by identifying all program structures that contain shared data structures, and identifying all data structures shared by two or more program structures, and then removing all other data structures and program structures from the original program. For the example program in FIG. 7A, the resulting model (program) is shown in FIG. 7B.

As may be seen, the top FOR loop shown in FIG. 7A is missing in the model/program of FIG. 7B, as are all but one input and all outputs. Additionally, the multiply operation (multiple node) is missing from the left FOR loop, and the summation and product operations (nodes) are also missing from the right FOR loop.

Correlation analysis may then be performed on this smaller (model) program in FIG. 7B, which may conclude that the best transforms to apply are unroll-by-2 on both of these FOR loops. This analysis may be used to decide to apply the same unroll-by-2 transform to the corresponding FOR loops in the original program of FIG. 7A, namely the lower 2 FOR loops in FIG. 7A. Therefore, the analysis results from the model program may be used to estimate (or predict or project) the results of the transforms on the original program. Since the model is a much simpler program compared to the original program, the analysis on the extracted model may be much faster than on the original program.

Creating a Graphical Program

As noted above, in some embodiments, the programs implementing the techniques disclosed herein and/or the programs to which the techniques are applied, may be graphical programs. The following describes various exemplary embodiments of graphical program creation.

A graphical program may be created on the computer system 82 (or on a different computer system). The graphical program may be created or assembled by the user arranging on a display a plurality of nodes or icons and then interconnecting the nodes to create the graphical program. In response to the user assembling the graphical program, data structures may be created and stored which represent the graphical program. The nodes may be interconnected in one or more of a data flow, control flow, or execution flow format. The graphical program may thus comprise a plurality of interconnected nodes or icons which visually indicates the functionality of the program. As noted above, the graphical program may comprise a block diagram and may also include a user interface portion or front panel portion. Where the graphical program includes a user interface portion, the user may optionally assemble the user interface on the display. As one example, the user may use the LabVIEW graphical programming development environment to create the graphical program.

In an alternate embodiment, the graphical program may be created by the user creating or specifying a prototype, followed by automatic or programmatic creation of the graphical program from the prototype. This functionality is described in U.S. patent application Ser. No. 09/587,682 titled "System and Method for Automatically Generating a Graphical Program to Perform an Image Processing Algorithm", which is hereby incorporated by reference in its entirety as though fully and completely set forth herein. The graphical program may be created in other manners, either by the user or programmatically, as desired. The graphical program may implement a measurement function that is desired to be performed by the instrument.

In another embodiment, a graphical user interface or front panel for the graphical program may be created, e.g., in response to user input. The graphical user interface may be created in any of various ways, e.g., depending on the graphical programming development environment used.

A block diagram for the graphical program may be created. The block diagram may be created in or using any graphical programming development environment, such as LabVIEW, Simulink, VEE, or another graphical programming development environment. The block diagram may be created in response to direct user input, e.g., the user may create the block diagram by placing or "dragging and dropping" icons or nodes on the display and interconnecting the nodes in a desired fashion. Alternatively, the block diagram may be programmatically created from a program specification. The plurality of nodes in the block diagram may be interconnected to visually indicate functionality of the graphical program. The block diagram may have one or more of data flow, control flow, and/or execution flow representations.

It is noted that the graphical user interface and the block diagram may be created separately or together, in various orders, or in an interleaved manner. In one embodiment, the user interface elements in the graphical user interface or front panel may be specified or created, and terminals corresponding to the user interface elements may appear in the block diagram in response. For example, when the user places user interface elements in the graphical user interface or front panel, corresponding terminals may appear in the block diagram as nodes that may be connected to other nodes in the block diagram, e.g., to provide input to and/or display output from other nodes in the block diagram. In another embodiment, the user interface elements may be created in response to the block diagram. For example, the user may create the block diagram, wherein the block diagram includes terminal icons or nodes that indicate respective user interface elements. The graphical user interface or front panel may then be automatically (or manually) created based on the terminal icons or nodes in the block diagram. As another example, the graphical user interface elements may be comprised in the diagram.

Although the embodiments above have been described in considerable detail, numerous variations and modifications will become apparent to those skilled in the art once the above disclosure is fully appreciated. It is intended that the following claims be interpreted to embrace all such variations and modifications.

We claim:

1. A non-transitory computer accessible memory medium that stores program instructions executable by a processor to implement:

storing a program, wherein the program comprises a plurality of program structures and one or more data objects distinct from the plurality of program structures, and wherein each of the one or more data objects is shared by a respective at least two of the plurality of program structures;

for each program structure of the plurality of program structures, analyzing decomposition effects on each of the one or more data objects shared by the program structure resulting from each of a respective one or more optimizing transforms applied to the program structure, wherein said analyzing is performed in context of the program structure and independent of other program structures in the program, wherein the decomposition effects comprise results of how the one or more data objects would be modified as a consequence of the respective one or more optimizing transforms being applied to the program structure; and determining, based on said analyzing, one or more groups of correlated structures, each group comprising:

two or more program structures that share at least one data object; and at least one optimizing transform that is compatible with respect to the two or more program structures and the shared at least one data object, wherein the at least one optimizing transform can operate on the two or more program structures without causing conflicting modifications of the shared at least one data object; and transforming the two or more program structures to meet a specified optimization objective, using the at least one optimizing transform for at least one group of correlated structures.

2. The non-transitory computer accessible memory medium of claim 1, wherein the one or more groups of correlated structures comprise a plurality of groups of correlated structures, wherein two or more of the groups of correlated structures share a program structure, the method further comprising:

analyzing the two or more of the groups of correlated structures; and determining, based on said analyzing, whether the respective at least one optimizing transform of at least one of the two or more groups of correlated structures is compatible with respect to the other groups of the two or more groups of correlated structures.

3. The non-transitory computer accessible memory medium of claim 2, wherein the program instructions are further executable to implement:

determining, based on said analyzing, that a first respective at least one optimizing transform of one of the two or more groups of correlated structures is compatible with respect to all other groups of the two or more groups of correlated structures;

wherein the first respective at least one optimizing transform is usable to transform the respective two or more program structures and the at least one data object of each of the two or more groups of correlated structures to meet the specified optimization objective.

4. The method of claim 2, wherein the program instructions are further executable to implement:

determining, based on said analyzing, that a respective at least one optimizing transform of at least two of the two or more groups of correlated structures is compatible with all other groups of the two or more groups of correlated structures;

analyzing each of the respective at least one optimizing transforms of the at least two of the two or more groups of correlated structures; and selecting a first respective at least one optimizing transform based on said analyzing each of the respective at least one optimizing transforms;

wherein the first respective at least one optimizing transform is usable to transform the respective two or more program structures and the at least one data object of each of the two or more groups of correlated structures to meet the specified optimization objective.

5. The non-transitory computer accessible memory medium of claim 2, wherein the program instructions are further executable to implement:

determining, based on said analyzing, that no respective optimizing transform of each of the two or more groups of correlated structures is compatible with all other groups of the two or more groups of correlated structures; and indicating that the respective optimizing transforms of the two or more groups are incompatible for use in transforming the program structures and data objects of the two or more groups.

6. The non-transitory computer accessible memory medium of claim 1, wherein said analyzing decomposition effects of each of the respective one or more optimizing transforms comprises:

for at least one transform of the respective one or more optimizing transforms:

applying a corresponding transform to a model of the program structure and the at least one data object, wherein said applying generates estimated decomposition effects of the at least one transform; and analyzing the estimated decomposition effects.

7. The non-transitory computer accessible memory medium of claim 6, wherein the program instructions are further executable to implement:

analyzing the program structure and the at least one data object; and generating the model of the program structure and the at least one data object based on the analysis.

8. The non-transitory computer accessible memory medium of claim 1, wherein the plurality of program structures comprises one or more of:

at least one nested program structure;

at least one cascaded program structure;

two or more parallel program structures; or a combination of at least two of the at least one nested program structure, the at least one cascaded program structure, or the two or more parallel program structures.

9. The non-transitory computer accessible memory medium of claim 1, wherein the program comprises one or more of:

a data flow program;

a graphical program;

a graphical data flow program; or a hardware description program.

10. The non-transitory computer accessible memory medium of claim 1, wherein the program comprises one or more of:

a procedural program;

a functional program;

a textual program; or a declarative program.

11. The non-transitory computer accessible memory medium of claim 1, wherein the respective one or more optimizing transforms comprise at least one of:

loop unrolling;

loop merging;

loop splitting;

loop peeling;

rewriting a WHILE loop as a FOR loop with conditional exit;

code motion;

code outlining;

code clumping; or in-lining a subprogram, function, or procedure.

12. The non-transitory computer accessible memory medium of claim 1, wherein at least one of the respective one or more optimizing transforms comprises a combination of optimizing transforms.

13. The non-transitory computer accessible memory medium of claim 1, wherein the program instructions are further executable to implement:

for the at least one group of correlated structures, applying the at least one optimizing transform to the two or more program structures and the at least one data object to meet the specified optimization objective.

14. The non-transitory computer accessible memory medium of claim 1, wherein the program instructions are further executable to implement:
compiling the program, comprising generating code configured to run on one or more of:
a desktop computer with one or more central processing unit (CPU) cores;
an embedded computer with one or more CPU cores;
a graphics processing unit (GPU);
an embedded GPU;
a field programmable gate array (FPGA); or
an application specific integrated circuit (ASIC).

15. The non-transitory computer accessible memory medium of claim 1, wherein each data object comprises a variable or a data structure.

16. The non-transitory computer accessible memory medium of claim 1, wherein the one or more data objects in the program comprise one or more of:
an array;
a cluster, struct, or record;
an array of arrays, clusters, structs, or records;
a cluster of arrays;
a struct of arrays;
a record of arrays; or
a static or global variable.

17. The non-transitory computer accessible memory medium of claim 1, wherein the decomposition effects of each of the respective one or more optimizing transforms on the at least one data object comprise one or more of:
arrays resulting from array partitioning;
arrays resulting from array jamming;
arrays resulting from array copying;
arrays resulting from array remapping;
arrays resulting from array linearization;
scalar data objects resulting from scalarization of array, cluster, record, or struct;
number of bits required to store and represent data objects;
array sizes required to store and represent arrays;
estimated performance metric;
estimated resource usage metric; (e.g. FPGA resource utilization, ASIC gate count) maximum path length in dataflow graphs;
cycle path length in feedback loops in dataflow graphs; or
numbers of nodes or edges in dataflow graphs.

18. The non-transitory computer accessible memory medium of claim 1, wherein the at least one optimizing transform is compatible with the two or more program structures and the shared at least one data object when the respective decomposition effects of the at least one optimizing transform on the shared at least one data object with respect to the two or more program structures have at least one of the following relationships:
equality;
less than, or less than or equal to;
greater than, or greater than or equal to;
implied by;
subsumed by;
non-overlapping; or
non-intersecting.

19. The non-transitory computer accessible memory medium of claim 1, wherein the specified optimization objective is with respect to optimization of one or more of:
run time;
compile time;
code size;
memory footprint size;
stack size;
processor concurrency;
programmable hardware element (PHE) or application specific integrated circuit (ASIC) resource utilization;
PHE or ASIC compile time;
PHE bitfile size;
ASIC netlist file size;
PHE or ASIC clock rate;
PHE or ASIC throughput;
PHE or ASIC latency; or
PHE or ASIC I/O sampling rate.

20. A computer-implemented method, the method comprising:
utilizing a computer to perform:
storing a program in a memory medium of the computer, wherein the program comprises a plurality of program structures and one or more data objects distinct from the plurality of program structures, and wherein each of the one or more data objects is shared by a respective at least two of the plurality of program structures;
for each program structure of the plurality of program structures, analyzing decomposition effects on each of the one or more data objects shared by the program structure resulting from each of a respective one or more optimizing transforms applied to the program structure, wherein said analyzing is performed in context of the program structure and independent of other program structures in the program, wherein the decomposition effects comprise results of how the one or more data objects would be modified as a consequence of the respective one or more optimizing transforms being applied to the program structure; and
determining, based on said analyzing, one or more groups of correlated structures, each group comprising:
two or more program structures that share at least one data object; and
at least one optimizing transform that is compatible with respect to the two or more program structures and the shared at least one data object, wherein the at least one optimizing transform can operate on the two or more program structures without causing conflicting modifications of the shared at least one data object; and
transforming the two or more program structures to meet a specified optimization objective, using the at least one optimizing transform for at least one group of correlated structures.

* * * * *